US 11,397,523 B2
Jul. 26, 2022

United States Patent
Langholz et al.

(54) FACILITATING THE SENDING OF MULTIMEDIA AS A MESSAGE

(71) Applicant: Meta Platforms, Inc., Menlo Park, CA (US)

(72) Inventors: Benjamin S. Langholz, San Francisco, CA (US); William Mcmillan Tyler, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/826,032

(22) Filed: Nov. 29, 2017

(65) Prior Publication Data
US 2018/0081518 A1 Mar. 22, 2018

Related U.S. Application Data

(63) Continuation of application No. 14/312,481, filed on Jun. 23, 2014, now Pat. No. 9,836,207.
(Continued)

(51) Int. Cl.
*G06F 3/048* (2013.01)
*G06F 3/0488* (2022.01)
(Continued)

(52) U.S. Cl.
CPC .......... *G06F 3/0488* (2013.01); *G06F 3/0481* (2013.01); *G06F 3/0482* (2013.01);
(Continued)

(58) Field of Classification Search
CPC ......... G06F 2203/04803; G06F 3/0481; G06F 3/0482; G06F 3/04842; H04L 51/04
See application file for complete search history.

(56) References Cited

U.S. PATENT DOCUMENTS 6,473,769 B1  10/2002  Andrew et al.
8,428,453 B1   4/2013  Spiegel et al.
(Continued)

FOREIGN PATENT DOCUMENTS

CN    103685729 A    3/2014
EP    2582120        4/2013
(Continued)

OTHER PUBLICATIONS

U.S. Appl. No. 14/308,188, Jan. 4, 2018, Office Action.
(Continued)

*Primary Examiner* — Thanh T Vu

(57) ABSTRACT

One or more embodiments described herein include methods and systems of sending multimedia content items as electronic communications. More specifically, systems and methods described herein provide user the ability to easily and effectively select multimedia content items stored on a computing device for inclusion in a communication session without navigating away from the communication session. Additionally, systems and methods described herein provide a user the ability to edit multimedia content items for inclusion in the communication session.

20 Claims, 14 Drawing Sheets

Related U.S. Application Data

(60) Provisional application No. 61/985,456, filed on Apr. 28, 2014.

(51) Int. Cl.

| | |
|---|---|
| *G06F 3/04842* | (2022.01) |
| *G06F 3/16* | (2006.01) |
| *G06F 3/0481* | (2022.01) |
| *G06F 3/04886* | (2022.01) |
| *H04L 51/02* | (2022.01) |
| *H04N 5/232* | (2006.01) |
| *H04L 51/066* | (2022.01) |
| *G06F 3/0482* | (2013.01) |
| *G06F 3/04847* | (2022.01) |
| *H04L 51/10* | (2022.01) |
| *H04N 7/14* | (2006.01) |
| *G06T 11/00* | (2006.01) |
| *H04L 51/00* | (2022.01) |
| *H04L 51/52* | (2022.01) |
| *H04L 51/04* | (2022.01) |

(52) U.S. Cl.
CPC ...... *G06F 3/04842* (2013.01); *G06F 3/04847* (2013.01); *G06F 3/04886* (2013.01); *G06F 3/16* (2013.01); *G06T 11/001* (2013.01); *H04L 51/02* (2013.01); *H04L 51/066* (2013.01); *H04L 51/10* (2013.01); *H04L 51/16* (2013.01); *H04L 51/32* (2013.01); *H04N 5/23216* (2013.01); *H04N 5/23293* (2013.01); *H04N 7/142* (2013.01); *G06F 2203/04803* (2013.01); *G06T 2200/24* (2013.01); *H04L 51/04* (2013.01)

(56) References Cited

U.S. PATENT DOCUMENTS

| | | |
|---|---|---|
| 9,391,933 B2 | 7/2016 | Langholz |
| 9,391,934 B2 | 7/2016 | Langholz |
| 9,836,207 B2 | 12/2017 | Langholz |
| 2006/0123086 A1 | 6/2006 | Morris |
| 2006/0215242 A1 | 9/2006 | Besharat et al. |
| 2006/0223502 A1 | 10/2006 | Doulton |
| 2007/0054678 A1 | 3/2007 | Doulton |
| 2007/0136750 A1* | 6/2007 | Abanami .......... H04N 5/44543 725/44 |
| 2008/0055269 A1 | 3/2008 | Lemay et al. |
| 2008/0119235 A1 | 5/2008 | Nielsen et al. |
| 2009/0027480 A1 | 1/2009 | Choi |
| 2009/0070675 A1* | 3/2009 | Li .......... G06Q 20/12 715/716 |
| 2009/0177981 A1 | 7/2009 | Christie et al. |
| 2010/0123724 A1* | 5/2010 | Moore .......... G06F 3/04817 345/473 |
| 2010/0124906 A1* | 5/2010 | Hautala .......... G06Q 10/10 455/412.1 |
| 2010/0150322 A1 | 6/2010 | Yin et al. |
| 2010/0169772 A1* | 7/2010 | Stallings .......... G06F 3/04812 715/702 |
| 2010/0231523 A1 | 9/2010 | Chou |
| 2010/0267369 A1 | 10/2010 | Lim et al. |
| 2010/0332518 A1 | 12/2010 | Song et al. |
| 2011/0119619 A1* | 5/2011 | Fong .......... H04N 5/23216 715/784 |
| 2011/0267530 A1 | 11/2011 | Chun |
| 2011/0276901 A1 | 11/2011 | Zambetti et al. |
| 2012/0022865 A1 | 1/2012 | Milstein |
| 2012/0102403 A1 | 4/2012 | Pennington et al. |
| 2012/0190388 A1* | 7/2012 | Castleman .......... H04L 51/04 455/466 |
| 2012/0269334 A1 | 10/2012 | Goguen et al. |
| 2012/0284659 A1* | 11/2012 | De Leon .......... H04M 1/72552 715/780 |
| 2012/0317210 A1 | 12/2012 | Fisher et al. |
| 2013/0091443 A1 | 4/2013 | Park et al. |
| 2013/0093833 A1* | 4/2013 | Al-Asaaed .......... G06F 3/04886 348/14.02 |
| 2013/0101097 A1 | 4/2013 | Shaw |
| 2013/0120447 A1 | 5/2013 | Kim et al. |
| 2013/0122944 A1 | 5/2013 | Yun et al. |
| 2013/0179800 A1 | 7/2013 | Jeong et al. |
| 2013/0235074 A1* | 9/2013 | Cherna .......... G06T 11/60 345/619 |
| 2013/0239031 A1 | 9/2013 | Ubillos et al. |
| 2013/0332870 A1 | 12/2013 | Kim et al. |
| 2014/0009475 A1 | 1/2014 | Setton et al. |
| 2014/0040773 A1 | 2/2014 | Sanghavi et al. |
| 2014/0052794 A1* | 2/2014 | Tucker .......... G06Q 50/01 709/206 |
| 2014/0085487 A1* | 3/2014 | Park .......... H04N 5/23216 348/207.1 |
| 2014/0118563 A1 | 5/2014 | Mehta et al. |
| 2014/0184544 A1 | 7/2014 | Lim et al. |
| 2014/0253463 A1 | 9/2014 | Hicks |
| 2014/0253522 A1 | 9/2014 | Cueto |
| 2014/0258426 A1 | 9/2014 | Lee |
| 2014/0289664 A1 | 9/2014 | Honda et al. |
| 2015/0040029 A1 | 2/2015 | Koum et al. |
| 2015/0089389 A1 | 3/2015 | Cohen-Zur et al. |
| 2015/0135108 A1 | 5/2015 | Pope et al. |
| 2015/0264303 A1 | 9/2015 | Chastney et al. |
| 2015/0312175 A1 | 10/2015 | Langholz |
| 2016/0050289 A1 | 2/2016 | Cohen et al. |
| 2016/0127287 A1 | 5/2016 | Oh et al. |
| 2016/0283109 A1 | 9/2016 | Langholz |
| 2016/0299658 A1 | 10/2016 | Langholz |

FOREIGN PATENT DOCUMENTS

| | | |
|---|---|---|
| EP | 2712165 | 3/2014 |
| JP | 2004-304297 A | 10/2004 |
| JP | 2008-142332 A | 6/2008 |
| JP | 2013-161167 A | 8/2013 |
| JP | 2013-214283 A | 10/2013 |
| JP | 2014-063342 A | 4/2014 |
| KR | 10-2012- 0003566 | 1/2012 |
| KR | 10-1331444 B1 | 11/2013 |
| KR | 10-2014- 0012504 | 2/2014 |
| KR | 10-2014- 0039737 | 4/2014 |
| WO | WO 2011085248 A1 | 7/2011 |

OTHER PUBLICATIONS

U.S. Appl. No. 15/179,584, Apr. 6, 2018, Office Action.
Office Action as received in European application 14173537.3 dated Apr. 15, 2019.
U.S. Appl. No. 15/179,584, Aug. 22, 2019, Office Action.
U.S. Appl. No. 15/191,157, Oct. 15, 2019, Office Action.
U.S. Appl. No. 15/179,584, Sep. 24, 2018, Office Action.
U.S. Appl. No. 15/191,157, Sep. 17, 2018, Office Action.
Apple: "Apple iPhone 4s running iOS version 7.0.6", Iphone 4S Running iOS 7, Sep. 2013.
International Search Report as received in PCT/US2014/043703 dated Jan. 12, 2015.
International Search Report as received in PCT/US2014/044138 dated Jan. 12, 2015.
Extended European Search Reportas received in EP14173880.7 dated Oct. 1, 2015.
Extended European Search Reportas received in EP14173537.3 dated Oct. 5, 2015.
Office Action as received in Japanese application 2016-554631 dated Aug. 8, 2017—English translation.
Office Action as received in Japanese application 2016-554683 dated Aug. 1, 2017—English translation.
XP55215941: "Illustration of features of the iMessage Software of iOS 7", as released withiOS7 by Apple onSep. 18, 2013, pp. 1-11,[document created by the examiner on Sep. 24, 2015] [screen shots taken on Sep. 22, 2015].

(56) References Cited

OTHER PUBLICATIONS

XP055215944**: "The History of iOS", Sep. 1, 2013, Retrieved from the Internet: URL:http://chaione.comiwp-content/uploads/2013/09/history-of-ios-inographic-Final.png [retrieved on Sep. 24, 2015].
U.S. Appl. No. 14/311,758, Sep. 30,2015 Office Action.
U.S. Appl. No. 14/311,758, Mar. 8, 2016, Notice of Allowance.
U.S. Appl. No. 14/308,188, May 9, 2016, Office Action.
U.S. Appl. No. 14/308,188, Oct. 5, 2016, Office Action.
U.S. Appl. No. 14/308,188, Jul. 10, 2017, Office Action.
U.S. Appl. No. 14/312,481, Mar. 29, 2016, Office Action.
U.S. Appl. No. 14/312,481, Aug. 3, 2016, Office Action.
U.S. Appl. No. 14/312,481, Nov. 22, 2016, Office Action.
U.S. Appl. No. 14/312,481, May 5, 2017, Office Action.
U.S. Appl. No. 14/312,481, Sep. 7, 2017, Notice of Allowance.
U.S. Appl. No. 14/314,623, Jul. 9, 2015, Office Action.
U.S. Appl. No. 14/314,623, Oct. 27, 2015, Office Action.
U.S. Appl. No. 14/314,623, Mar. 14, 2016, Notice of Allowance.
U.S. Appl. No. 15/179,584, Feb. 28, 2019, Office Action.
U.S. Appl. No. 15/191,157, Jan. 25, 2019, Office Action.
Summons to attend oral proceedings as received in European application 14173537.3 dated Feb. 25, 2020.
Office Action as received in Brazilian application BR112016019976-6 dated Mar. 17, 2020.
Office Action as received in Brazilian Application BR112016025271-3 dated Apr. 1, 2020.
U.S. Appl. No. 15/179,584, Apr. 29, 2020, Notice of Allowance.
U.S. Appl. No. 15/191,157, Feb. 18, 2020, Office Action.
U.S. Appl. No. 14/308,188, Jul. 13, 2020, Notice of Allowance.
U.S. Appl. No. 15/191,157, Nov. 18, 2020, Notice of Allowance.
Examination Report as received in Indian Application 201647026505 dated Dec. 18, 2020.
Examination Report as received in Indian Application 201647026382 dated Sep. 21, 2020.
Extended European Search Report as received in European Application 20212574.6 dated Apr. 20, 2021.
Extended European Search Report as received in European Application 21155455.5 dated Jun. 29, 2021.

* cited by examiner

FACILITATING THE SENDING OF MULTIMEDIA AS A MESSAGE

CROSS REFERENCE TO RELATED APPLICATIONS

The present application is a continuation of U.S. application Ser. No. 14/312,481 filed Jun. 23, 2014, which claims priority to and the benefit of U.S. Provisional Application No. 61/985,456 filed Apr. 28, 2014. Each of the aforementioned patents and applications are hereby incorporated by reference in their entirety.

BACKGROUND

1. Technical Field

One or more embodiments relate generally to electronic messaging systems and methods. More specifically, one or more embodiments relate to systems and methods for increasing functionality in an electronic messaging system.

2. Background and Relevant Art

Computing devices (e.g., computers, tablets, and smart phones) provide numerous ways for people to connect and communicate with one another. For example, a variety of electronic messaging systems provide various methods to send and receive electronic messages. For instance, a computing device can allow a user to communicate with other users using text messaging, instant messaging, social network posting, and other forms of electronic communication. In addition, an electronic communication may include a variety of content including text, images, video, audio, and/or other multimedia. In general, electronic communication has become a popular way for people to connect and communicate with one another.

Including multimedia in electronic communications has become an especially popular way to add humor, context, and information to an electronic communication session. For example, a user may send a digital photograph to a co-user indicating his location. Similarly, a user may send a video laughing in response to an electronic message that includes a joke. Thus, including multimedia in an electronic communication is an easy way to add a layer of expression to an electronic communication session that is typically difficult with only textual messages.

Conventional processes for including multimedia in an electronic communication session are generally problematic. For example, a user typically navigates through several different user interfaces in order to select existing multimedia for inclusion in an electronic message. Navigating away from the electronic communication interface, however, can cause a user to miss messages or otherwise make adding multimedia time consuming and frustrating for a user.

Additionally, a user is typical not able to easily edit multimedia for inclusion in an electronic communication session. For example, a user may wish to edit light contrast, color saturation, or some other characteristic in a digital photograph and then include the edited digital photograph in an electronic communication. Generally, in order to include edited multimedia in an electronic communication, a user first must edit the multimedia using software specifically dedicated to that purpose. Thus, a user is typically not able to edit multimedia without navigating away from the electronic communication session. This adds extra steps and hassle to the process of composing an electronic communication.

Thus, there are several disadvantages to current methods for including multimedia in an electronic message.

SUMMARY

One or more embodiments provide benefits and/or solve one or more of the foregoing and other problems in the art with methods and systems that provide enhanced functionality for electronic messaging systems. For example, methods and systems described herein allow users greater functionality for including multimedia content items in electronic messages. Furthermore, one or more embodiments can provide the foregoing or other benefits through an intuitive user interface.

In addition to the foregoing, systems and methods of one or more embodiments allow a user to select an existing multimedia content item for inclusion in an electronic message without navigating away from a communication thread. For example, in one or more embodiments, a user interface displays both a communication thread with electronic messages sent between co-users and a collection of stored multimedia content items. Thus, a user may browse and select a stored multimedia content item without navigating away from the communication thread.

Furthermore, systems and methods of one or more embodiments allow a user to easily edit multimedia content items for inclusion in an electronic message. For example, in one or more embodiments, a user may edit a digital photograph or video without having to utilize a separate piece of software. This provides the user with a more intuitive and streamlined way for including edited multimedia content items in an electronic message.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which.

DETAILED DESCRIPTION

Figure 1:
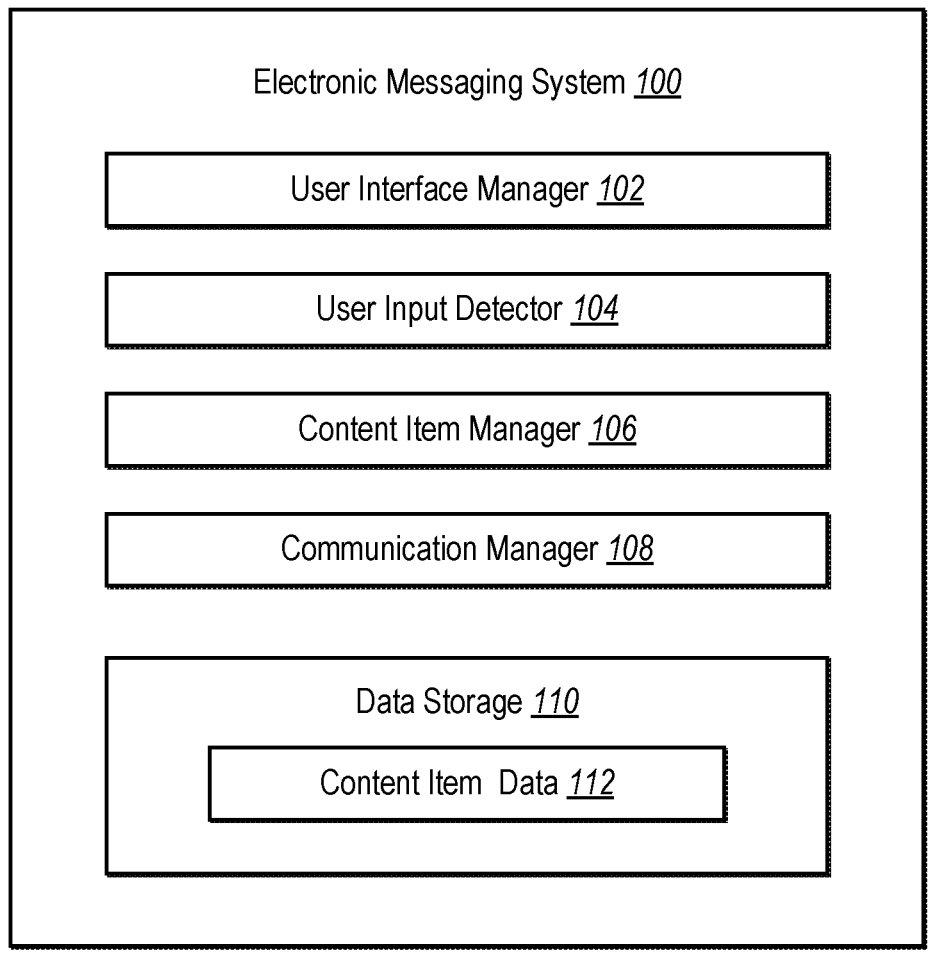
FIG. 1 illustrates a schematic diagram of an electronic messaging system in accordance with one or more embodiments.

One or more embodiments include an electronic messaging system that provides users with efficient and effective user experiences when sending electronic communications including multimedia content. More specifically, one or more embodiments described herein allow users to easily and intuitively select multimedia content for inclusion in an electronic communication. For example, one or more embodiments allow a user to select a multimedia content item for inclusion in an electronic message without navigating away from a communication thread.

In particular, one or more embodiments allow a user to browse and select a multimedia content item from a gallery of selectable multimedia content item without navigating away from the communication thread. For example, one or more embodiments display a graphical user interface that includes a communication thread with electronic messages sent between co-users, as well as a display area or gallery of selectable multimedia content items. Thus, one or more embodiments allow a user to receive and read messages while simultaneously browsing multimedia content items.

In one or more embodiments, the display area or gallery includes a preview of multimedia content items likely to be selected by the user. For example, the display area or gallery can include a predetermined number of the most recent multimedia content items. Alternatively, the display area or gallery can include multimedia content items related to participant in a communication session, content items related to a topic of the session, content items most often sent as messages, or content items selected by another criteria.

In addition to the foregoing, the electronic messaging system can modify a preview of multimedia content items to aid in viewing and selection of the content items. For example, the electronic messaging system can crop content items based on the size of the display area or gallery. Furthermore, the electronic messaging system auto-play videos in the display area or gallery.

Furthermore, the electronic messaging system can allow a user to easily and effectively edit a multimedia content item for inclusion in a message. For example, the one electronic messaging system can allow a user to start an editing process or edit a multimedia content item in the preview area or gallery without navigating away from the electronic messaging system. Thus, one or more embodiments allow a user to edit a multimedia content item without having to utilize a separate software outside of the electronic messaging system.

In one or more embodiments, the electronic messaging system provides the preview area or gallery of multimedia content items below a communication thread. The electronic messaging system allows a user to horizontally scroll through the multimedia content items. Upon detecting a selection of a multimedia content item, the electronic messaging system can provide options to edit or send the multimedia content item as a message. If the edit option is selected, the electronic messaging system can make the multimedia content item available for editing.

FIG. 1 illustrates an example embodiment of an electronic messaging system 100. As shown, the electronic messaging system 100 may include, but is not limited to, a user interface manager 102 (or simply "UI manager"), a user input detector 104, a content item manager 106, a communication manager 108, and a data storage 110. Each of the components 102-110 of the electronic messaging system 100 may be in communication with one another using any suitable communication technologies. Although the disclosure herein shows the components 102-110 to be separate in FIG. 1, any of the components 102-110 may be combined into fewer components, such as into a single facility or module, or divided into more components as may serve one or more embodiments. In addition, the components 102-110 may be located on, or implemented by, one or more computing devices, such as those described below in relation to FIG. 7. Alternatively, portions of the electronic messaging system 100 can be located on a computing device, while other portions of the electronic messaging system 100 are located on, or form part of, a social networking system, such as that described below in reference to FIG. 8.

The components 102-110 can comprise software, hardware, or both. For example, the components 102-110 can comprise one or more instructions stored on a computer readable storage medium and executable by a processor of one or more computing devices. When executed by the one or more processors, the computer-executable instructions of the electronic messaging system 100 can cause a computing device(s) to perform the methods described herein. Alternatively, the components 102-110 can comprise hardware, such as a special-purpose processing device to perform a certain function. Additionally or alternatively, the components 102-110 can comprise a combination of computer-executable instructions and hardware.

As mentioned above, and as shown in FIG. 1, the electronic messaging system 100 can include a user interface manager 102. The user interface manager 102 provides, manages, updates, and/or controls graphical user interfaces (or simply "user interfaces") that allow a user to view and interact with display elements. For example, the user interface manager 102 may identify, display, update, or otherwise provide various user interfaces that contain one or more display elements in various layouts.

More specifically, the user interface manager 102 can display a variety of display elements within a graphical user interface. For example, the user interface manager 102 may display a graphical user interface on a display of a computing device. For instance, display elements include, but are not limited to: buttons, text boxes, menus, thumbnails, scroll bars, hyperlinks, etc. In one or more embodiments, the user interface manager 102 can display and format display elements in any one of a variety of layouts.

Furthermore, the user interface manager 102 can also update, remove, resize, or reposition display elements in response to user interactions. For example, as will be described in more detail below, the electronic messaging system 100 may detect user input in a variety of ways. For instance, in one or more embodiments, the detected user input may cause the user interface manager 102 to update a graphical user interface based on the detected input. Similarly, in one or more embodiments, the detected user input may cause the user interface manager 102 to resize one or more display elements, to reposition one or more display elements within the graphical user interface, or to otherwise change or remove one or more display elements within the graphical user interface.

Additionally, the user interface manager 102 can selectively update certain areas of a user interface in response to user interactions. For example, in one or more embodiments, detected user input may cause the user interface manager 102 to update or change within only one area of a graphical user interface. In one or more embodiments, upon a detected user interaction, the user interface manager 102 may update one area within a user interface from one type of display to a second type of display, while continuing to display another area within the user interface with no updates.

Along similar lines, the user interface manager 102 can reorganize a user interface in response to user interactions. For example, in one or more embodiments, detected user input may cause the user interface manager 102 to split a graphical user interface into two or more areas. In one or more embodiments, upon a detected user interaction, the user interface manager 102 may reorganize a user interface from only displaying one area with a first collection of display elements to displaying two areas with the first collection of display elements in the first area and a second collection of display elements in the second area. Likewise, in one or more embodiments, the user interface manager 102 may also consolidate or remove areas within a graphical user interface in response to detected user interactions.

As mentioned above, and as illustrated in FIG. 1, the electronic messaging system 100 may further include a user input detector 104. The user input detector 104 detects, receives, and/or facilitates user input in any suitable manner. In some examples, the user input detector 104 detects one or more user interactions. As referred to herein, a "user interaction" means a single input, a combination of inputs, received from a user by way of one or more input devices, or via one or more touch gestures as described above. A user interaction can have variable duration and may take place anywhere on the graphical user interface managed by the user interface manager 102 described above.

For example, the user input detector 104 can detect a user interaction from a keyboard, mouse, touch screen display, or any other input device. In the event a touch screen display is utilized, the user input detector 104 can detect one or more touch gestures that form a user interaction (e.g., tap gestures, swipe gestures, pinch gestures, etc.) provided by a user by way of the touch screen. In some examples, the user input detector 104 can detect touch gestures in relation to and/or directed at one or more display elements displayed as part of the graphical user interface presented on the touch screen display. In one or more embodiments, the user input detector 104 may report any detected touch gesture in relation to and/or directed at one or more display elements to user interface manager 102.

The user input detector 104 may additionally, or alternatively, receive data representative of a user interaction. For example, the user input detector 104 may receive one or more user configurable parameters from a user, one or more user commands from the user, and/or any other suitable user input. For example, the user input detector 104 can receive voice commands or otherwise sense, detect, or receive user input.

As mentioned above, and as illustrated in FIG. 1, the electronic messaging system 100 may further include a content item manager 106. The content item manager 106 manages multimedia content items (such as digital files), tracks recent multimedia content items, creates previews of multimedia content items, manages edits to multimedia content items, and otherwise handles all actions effecting multimedia content items. For example, in one or more embodiments, the content item manager 106 determines the most recent content items stored on a system, creates or retrieves a preview of each of the recent content items, and presents the previews of the recent content items as part of a user interface.

For example, as will be described in more detail below, the electronic messaging system 100 may be implemented on a computing device with data storage. In one or more embodiments, the content item manager 106 searches the data storage of the computing device for multimedia content items suitable for inclusion in a communication session. For example, in one or more embodiments, the content item manager 106 may search the data storage of the computing device for digital photographs, digital videos, and/or sound recording. In one or more embodiments, the content item manager 106 may create a linked list linking to the multimedia files stored in the data storage of the computing device. Alternatively or additionally, the content item manager 106 may create a copy of the multimedia content items stored in the data storage of the computing device.

Once the content item manager 106 has identified the multimedia content items stored on the computing device, the content item manager 106 may create or retrieve a preview of each multimedia content items. For example, in one or more embodiments, the content item manager 106 may create a preview of a digital photograph by cropping multimedia content item based an aspect ratio of a user interface. For example, in one or more embodiments, the content item manager 106 may crop a rectangular preview of digital photograph and/or digital video such that the preview is square. Additionally, in one or more embodiments, the content item manager 106 may create a preview of a digital video that includes a portion of the digital video that automatically plays within a portion of the user interface.

In one or more embodiments, the content item manager 106 may search files stored on the computing device only for the most recent multimedia content items. For example, in one or more embodiments, the content item manager 106 may identify the ten most recent multimedia content items stored on the computing device. Alternatively, the content item manager 106 may identify a percentage of the most recent multimedia content items stored on the computing device. In one or more embodiments, the content item manager 106 may determine recentness of a multimedia content items by identifying a timestamp associated with the multimedia content items that indicates when the multimedia content items was created or added to the computing device. The content item manager 106 may then compare the identified timestamp to timestamps of other multimedia content items. In one or more alternative embodiments, the number or percentage of recent multimedia content items identified by the content item manager 106 may be a number configurable by the user or can be a set predetermined number.

Additionally, in one or more embodiments, the content item manager 106 may manage editing of multimedia content items. For example, in one or more embodiments, the content item manager 106 may create a copy of a multimedia content items, and present the copy for editing. In one or more embodiments, the content item manager 106 may track edits made to the copy of the multimedia content items and provide the edited copy for sending to one or more co-users. For instance, after a user selects a preview from the user interface, the content item manager 106 may create a copy of the multimedia content items associated with the preview and present the copy of the multimedia content items e to the user for editing. In one or more embodiments, the content item manager 106 may track edits to the copy of the multimedia content items and provide the edited copy of the multimedia content items for sending to one or more co-users as an electronic communication.

In one or more alternative embodiments, the content item manager 106 may provide the original multimedia content items for editing, rather than a copy of the multimedia content items, as discussed above. For example, in one or more embodiments, after a user selects a preview from the user interface, the content item manager 106 may present the multimedia content items associated with the preview to the user for editing. In that embodiment, the content item manager 106 may track edits to the multimedia content items and provide the edited multimedia content items for sending to one or more co-users as an electronic communication. Accordingly, in some embodiments, the content item manager 106 stores edits made to the multimedia content items within the data storage of a computing device, such that the edited multimedia content items is available to other applications on the computing device. In one or more alternative embodiments, as described above, the content item manager 106 discards edits made a copy of the multimedia content items once the copy of the multimedia content items has been provided for sending to one or more co-users of the communication system.

The content item manager 106 may enable a variety of edits to be performed in connection with either a multimedia content items, or a copy of a multimedia content items as described above. For example, with regard to digital photographs and/or digital videos, the content item manager 106 may allow for edits such as altering the color contrast, altering brightness, altering sharpness, altering clarity, inverting color (i.e., color to sepia, color to black and white), adding text or image overlays, adding blended image effects, or any other type of edit suitable to be made to a digital photograph and/or digital video. Furthermore, with regard to digital videos, the content item manager 106 may allow for edits such as adding scene transitions, adding front or end credits, shortening or lengthening the runtime of the video, adding a sound track, or any other type of edit suitable to be made in connection with a digital video. Additionally, with regard to sound recordings, the content item manager 106 may allow for edits such as altering volume, adding reverb, adding sound effects, concatenating additional recordings, or any other type of edit suitable to made in connection with a sound recording.

As mentioned above, and as illustrated in FIG. 1, the electronic messaging system 100 may further include a communication manager 108. The communication manager 108 can facilitate receiving and sending data to and from the electronic messaging system 100, or a device upon which the electronic messaging system 100 is implemented. In particular, the communication manager 108 can instruct or activate one or more communication interfaces of a computing device, as described below to send or receive data, particularly data related to electronic communications. Furthermore, the communication manager 108 can package or format content items to be sent or received from the electronic messaging system 100 in any necessary form that is able to be sent through one or more communication channels and using an appropriate communication protocol, as described further below with reference to FIG. 7.

As discussed above, the electronic messaging system 100 can include a data storage 110, as illustrated in FIG. 1. The data storage 110 may maintain content item data 112 representative of data associated with multimedia content items available for inclusion as an electronic communication. For example, the content item data 112 may include, but is not limited to: digital photographs, digital videos, recordings of sound inputs, as well as other data representing edits to the digital photographs, digital videos, and/or recordings of sound inputs.

Figure 2:
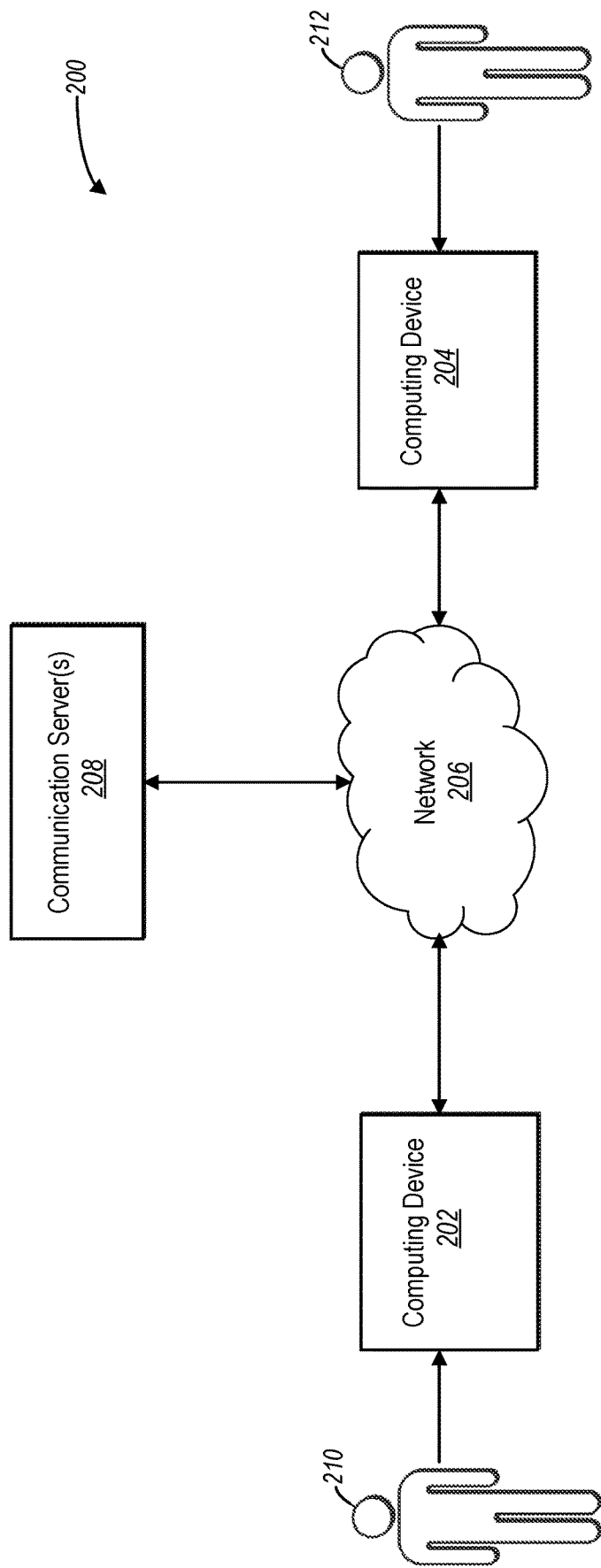
FIG. 2 illustrates a block diagram of an environment for implementing the system of FIG. 1 in accordance with one or more embodiments.

FIG. 2 is a schematic diagram illustrating an example system 200, within which one or more embodiments of the electronic messaging system 100 can be implemented. As illustrated in FIG. 2, the system 200 can include computing devices 202, 204, a network 206, and a communication server 208. The computing devices 202, 204, the network 206, and the communication server 208 may be communicatively coupled, as shown in FIG. 2. Although FIG. 2 illustrates a particular arrangement of the computing devices 202, 204, the network 206, and the communication server 208, various additional arrangements are possible. For example, the computing devices 202, 204 may directly communicate with the communication server 208, bypassing the network 206, or alternatively, may directly communicate with each other.

The computing devices 202, 204, the network 206, and the communication server 208 may communicate using any communication platforms and technologies suitable for transporting data and/or communication signals. For example, the computing devices 202, 204, the network 206, and the communication server 208 may communicate via any known communication technologies, devices, media, and protocols supportive of remote data communications, examples of which will be described in more detail below with respect to FIG. 7. In addition, in certain embodiments, the computing devices 202, 204, and the communication server 208 may communicate via the network 206, which may include one or more social networks as described further below with respect to FIG. 8.

The communication server 208 may generate, store, receive, and transmit electronic communication data. For example, the communication server 208 may receive an electronic communication from the computing device 202 and send the received electronic communication to the computing device 204. In particular, the communication server 208 can transmit electronic messages between one or more users of the system 200. The communication server 208 can receive a wide range of electronic communication types, including but not limited to, text messages, instant messages, social-networking messages, social-networking posts, emails, and any other form of electronic communication. Additional details regarding the communication server 208 will be discussed below with respect to FIG. 7.

The network 206 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 206 may be any suitable network over which the computing device 202 may access the communication server 208 and/or the computing device 204, or vice versa. The network 206 will be discussed in more detail below with regard to FIGS. 7 and 8.

In addition to the system and network elements of the system 200, FIG. 2 illustrates that a user 210 can be associated with the computing device 202, and that a user 212 can be associated with the computing device 204. Although FIG. 2 illustrates only two users 210, 212, the system 200 can include a large number of users, with each of the users interacting with the system 200 through one or more computing devices. For example, the user 210 can interact with the computing device 202 for the purpose of composing, and sending an electronic communication (e.g., instant message). The user 210 may interact with the computing device 202 by way of a user interface, managed by the user interface manager 102, on the computing device 202. For example, the user 210 can utilize the user interface to cause the computing device 202 to compose and send an electronic communication to one or more of the plurality of users of the system 200.

In one or more embodiments, the components 102-110, as described with regard to FIG. 1, may be implemented on one or more of the computing devices 202, 204 and the communication server 208. For example, the computing devices 202, 204, and the communication server 208 may communicate across the network 206 via the communication manager 108 of the electronic messaging system 100. In one or more embodiments, the computing devices 202, 204 may receive user inputs via the user input detector 104. Likewise, in one or more embodiments, the computing devices 202, 204 may provide graphical user interfaces via the user interface manager 102. Furthermore, in one or more embodiments each of the computing devices 202, 204 can include an instance of the electronic messaging system 100.

As will be described in more detail below, each of the components 100-110 of the electronic messaging system 100 as described with regard to FIGS. 1 and 2, can provide, alone and/or in combination with the other components of the electronic messaging system 100, one or more graphical user interfaces. In particular, the components 102-110 can allow a user to interact with a collection of display elements for a variety of purposes. In particular, FIGS. 3A-4E and the description that follows illustrate various example embodiments of the user interfaces and features that are in accordance with general principles as described above.

Figures 3A, 3B:
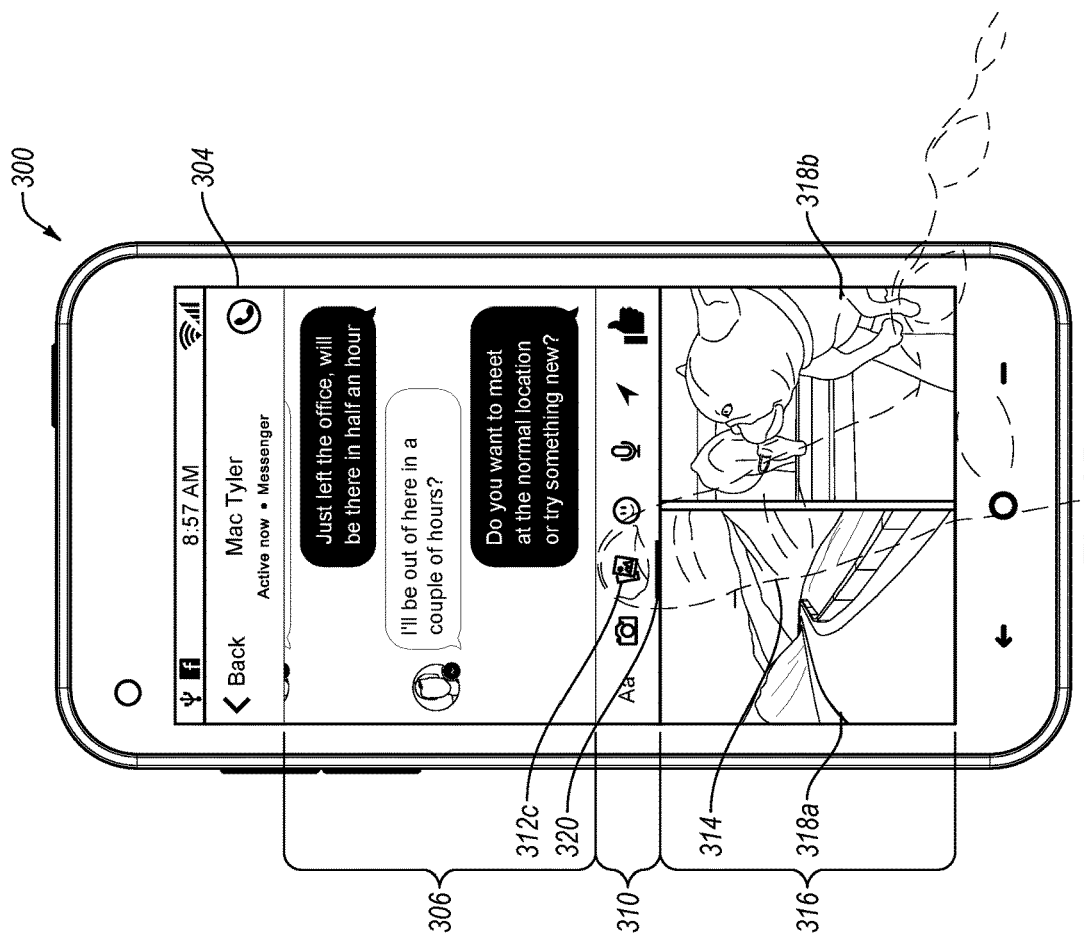
FIGS. 3A-3I illustrate user interfaces for selecting, editing, and sending a multimedia content item in accordance with one or more embodiments.

In some examples, a computing device (i.e., computing device 202, 204 of FIG. 2) can implement part or all of the electronic messaging system 100. For example, FIG. 3A illustrates a computing device 300 that may implement one or more of the components 102-110 of the electronic messaging system 100. As illustrated in FIG. 3A, the computing device 300 is a handheld device, such as a mobile phone device (e.g., a smartphone). As used herein, the term "handheld device" refers to a device sized and configured to be held/operated in a single hand of a user. in additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The computing device 300 can include any of the features and components described below in reference to a computing device 700 of FIG. 7. As illustrated in FIG. 3A, the computing device 300 includes a touch screen display 302 that can display or provide user interfaces and by way of which user input may be received and/or detected. As used herein, a "touch screen display" refers to the display of a touch screen device. In one or more embodiments, a touch screen device may be a computing device 202, 204 with at least one surface upon which a user 210, 212 may perform touch gestures (e.g., a laptop, a tablet computer, a personal digital assistant, a media player, a mobile phone). Additionally or alternatively, the computing device 300 may include any other suitable input device, such as a touch pad or those described below in reference to FIG. 7.

FIG. 3A illustrates a touch screen display 302 of the computing device 300 displaying one embodiment of a graphical user interface, in particular a messaging graphical user interface 304. For example, the user interface manager 102 provides various display areas and display elements as part of the messaging graphical user interface 304. In one or more embodiments, the messaging graphical user interface 304 includes a communication thread 306, as well as a message input control palette or toolbar 310.

As described above, the communication manager 108 can facilitate receiving and sending data. In one or more embodiments, the communication manager 108 facilitates receiving and sending of electronic communications between the computing devices 202, 204. Also in one or more embodiments, the user interface manager 102 displays electronic communications sent and received via the communication manager 108. In one or more embodiments, the user interface manager 102 can display electronic communications sent and received via the communication manager 108 in the communication thread 306 within the messaging graphical user interface 304.

For example, as illustrated in FIG. 3A, the user interface manager 102 provides the communication thread 306 that includes electronic messages 308a sent from an account of a user of the communication device 300. Similarly, the communication thread 306 can include electronic messages 308b received by the account of the user of the computing device 300. In one or more embodiments, the user interface manager 102 organizes the communication thread 306 such that new messages are added to the bottom of the communication thread 306 so that older messages are displayed at the top of the communication thread 306. In alternative embodiments, the user interface manager 102 may organize the messages 308a, 308b in any manner that may indicate to a user the chronological or other relationship between the messages 308a, 308b.

The user interface manager 102 provides a variety of electronic communication characteristics to help a user distinguish between electronic communications in the communication thread 306. For example, as illustrated in FIG. 3A, the user interface manager 102 displays the electronic messages 308a sent from an account of the user of the computing device 300 pointed toward one side (i.e., the right side) of the messaging graphical user interface 304. On the other hand, the user interface manager 102 displays the electronic messages 308b received by the communication manager 108 pointed toward the opposite side (i.e., the left side) of the messaging graphical user interface 304. In one or more embodiments, the positioning and orientation of the electronic messages 308a, 308b provides a clear indicator to a user of the computing device 300 of the origin of the various electronic communications displayed within the messaging graphical user interface 304.

Another characteristic provided by the user interface manager 102 that helps a user distinguish electronic communications may be a color of the electronic communications. For example, as shown in FIG. 3A, the user interface manager 102 displays sent electronic messages 308a in a first color and received electronic messages 308b in a second color. In one or more embodiments, the first and second colors may be black and white, respectively, with an inverted typeface color. In an alternative embodiment, the user interface manager 102 may display the electronic messages 308a, 308b with white backgrounds and different colored outlines.

In yet another alternative embodiment, the user interface manager 102 may display the electronic messages 308a, 308b with backgrounds of different patterns, in different fonts, in different sizes or in any other manner that may distinguish the sent electronic messages 308a from the received electronic messages 308b. For example, in one or more embodiments, the user interface manager 102 displays sent electronic messages 308a with white typeface on a blue background. Likewise, in one or more embodiments, the user interface manager 102 displays received electronic messages 308b with black typeface on a grey background.

As mentioned above, the user interface manager 102 may also provide a message input control palette or toolbar 310. As illustrated in FIG. 3A, the user interface manager 102 displays the message input control palette or toolbar 310 as part of the messaging graphical user interface 304. In one or more embodiments, the message input control palette or tool bar 310 includes a variety of selectable message input controls that provide a user with various message input options or other options. For example, in FIG. 3A, the message input control palette or toolbar 310 includes a text input control 312a, a photo or video input control 312b, a multimedia input control 312c, a symbol input control 312d, and a sound input control 312e. In one or more alternative embodiments, the message input control palette or toolbar 310 may provide the input controls 312a-312e in a different order, may provide other input controls not displayed in FIG. 3A, or may omit one or more of the input controls 312a-312e shown in FIG. 3A.

As will be described below in greater detail, a user may interact with any of the input controls 312a-312e in order to compose and send different types of electronic communications. For example, if a user interacts with the text input control 312a, the user interface manager 102 may provide a touch screen display keyboard in a portion of the messaging graphical user interface 304 that the user may utilize to compose a textual message. Similarly, if a user interacts with the photo input control 312b, the user interface manager 102 may provide a camera viewfinder interface within a portion of the messaging graphical user interface 304 that the user may utilize to add a photo to the communication thread 306. Furthermore, if a user interacts with the sound input control 312e, the user interface manager 102 may provide a sound recording control by way of which the user can record a voice or other sound message. Likewise, as will be described in more detail below, if a user interacts with the multimedia input control 312c, the user interface manager 102 may provide a multimedia content item display area with multimedia content items that the user can select to send as a message.

A user may interact with any of the message input controls 312a-e in order to compose and send a message to one or more co-users via the electronic messaging system 100. For example, in FIG. 3B, a finger 314 of a user's hand is shown interacting with the multimedia input control 312c. In one or more embodiments, the user input detector 104 can detect interactions (e.g., a tap touch gesture) of the finger 314 with the multimedia input control 312c. In one or more embodiments, the user interface manager 102 may display an input control indicator 320 to indicate which input control 312a-e is currently active. Additionally, as shown in FIG. 3B, upon the user input detector 104 detecting a tap touch gesture on the multimedia input control 312c, the user interface manager 102 can display a multimedia content item display area 316 containing one or more multimedia content item previews 318a, 318b.

Figure 3D:
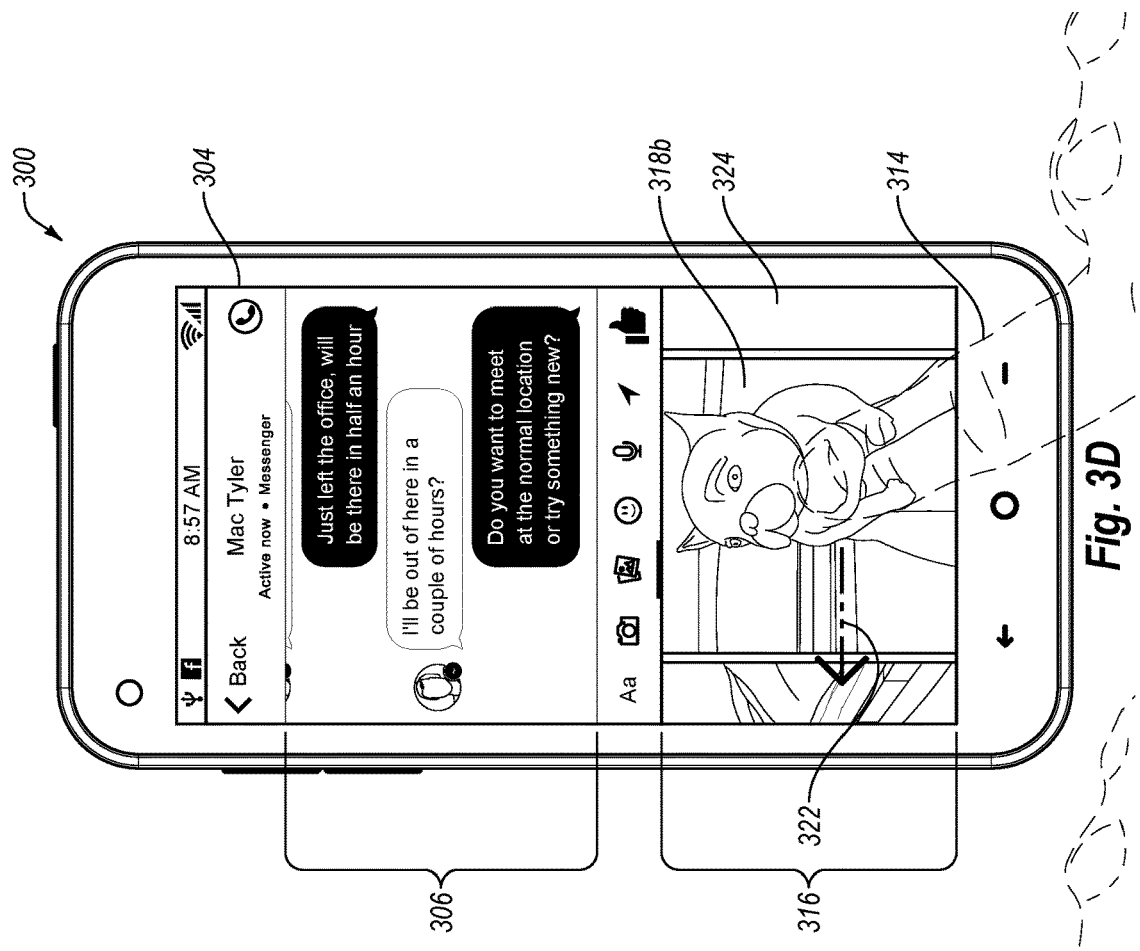
Figure 3C:
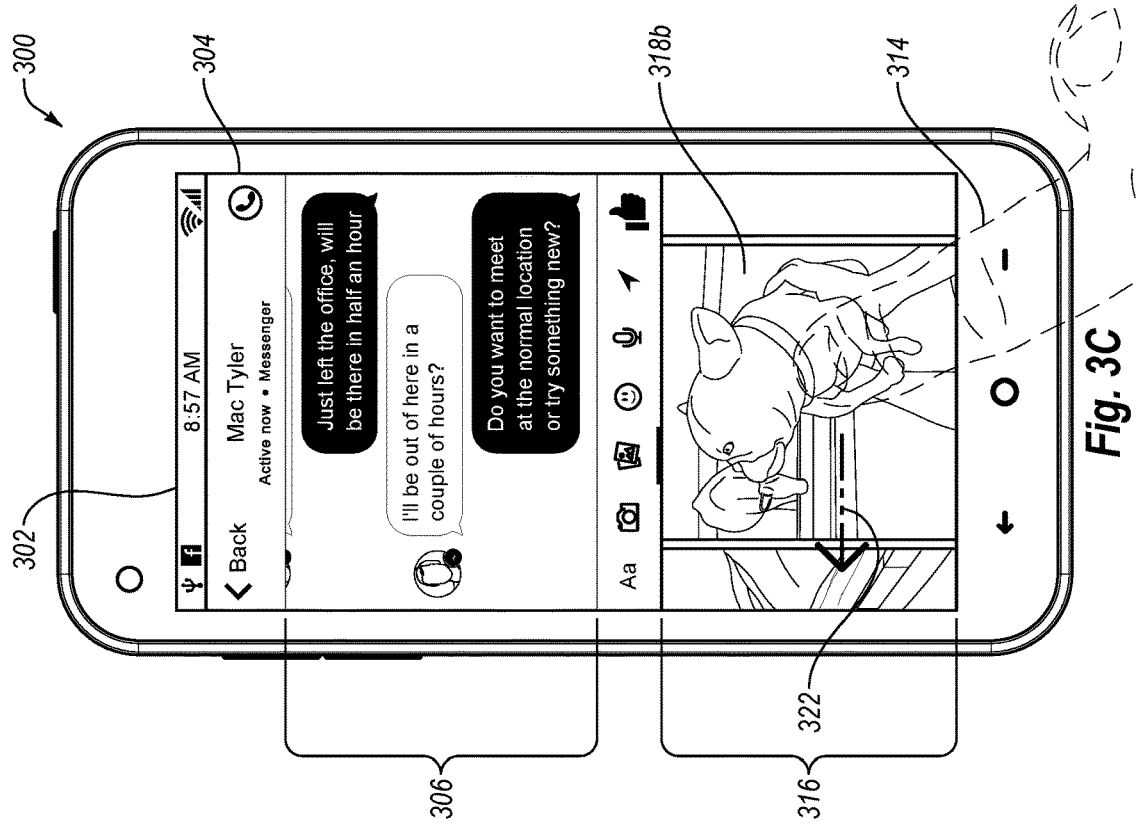
Figure 3F:
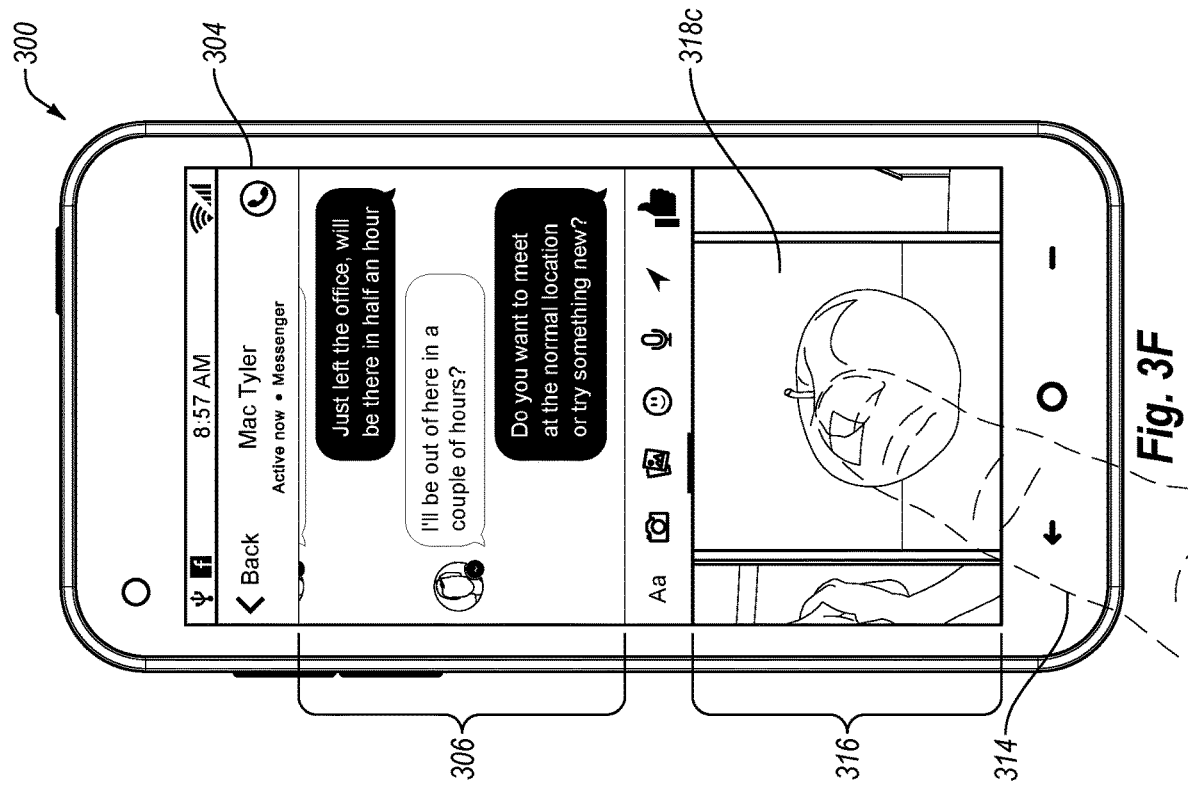

In particular, as illustrated by FIG. 3F, the user interface manager 102 can provide the communication thread 306 in a first portion (i.e., the upper portion) of the messaging user interface 304. The user interface manager 102 can provide the multimedia content item display area 316 in a second portion (i.e., the lower portion) of the messaging user interface 304. Thus, the user interface manager 102 can allow the user to both view the communication thread 306 and any new messages, while also being able to view and browse content items. In alternative embodiments the user interface manager 102 can arrange the communication thread 306 and the multimedia content item display area 316 horizontally or in another arrangement other than a vertical arrangement.

As discussed above, in one or more embodiments, the content item manager 106 provides the multimedia content item previews 318a, 318b based on multimedia content items stored on computing device 300. For example, as shown in FIG. 3B, the content item manager 106 may provide the multimedia content item preview 318a based on a digital photograph stored on the computing device 300. In one or more embodiments, the content item manager 106 provides the multimedia content item preview 318a in the multimedia content item display area 316 based on the recentness of the multimedia content item associated with the content item preview 318a. In other words, in one or more embodiments, the multimedia content item associated with the content item preview 318a is the most recently stored multimedia content item on the computing device 300 or the most recently captured or created multimedia content item on the computing device 300.

In one or more embodiments, the content item manager 106 may crop the multimedia content item to create the content item preview 318a. For example, the multimedia content item associated with the multimedia content item preview 318a may be a rectangular digital photograph stored on the computing device 300. Accordingly, in one or more embodiments, the content item manager 106 may crop the rectangular digital so that the content item preview 318a is square and sized for presentation in the multimedia content item display area 316. Additionally, in one or more embodiments, the content item manager 106 may tailor the cropped content item preview 318a to an aspect ratio of the multimedia content item display area 316. In other words, in one or more embodiments, the content item manager 106 may tailor the cropped content item preview 318a such that it is square within the multimedia content item display area 316 even if the multimedia content item display area 316 takes up a larger portion of the messaging graphical user interface 304 than is shown in FIG. 3B.

By cropping the multimedia content items, the content item manager 106 can help ensure that more than one content item preview 318a, 318b can be shown in the multimedia content item display area 316. Additionally, by cropping the multimedia content items, the content item manager 106 can help ensure that the content items can fit within the communication thread 306. Still another benefit of cropping the multimedia content items is to reduce a file size of the multimedia content items to enable quicker sending, receiving, and displaying of multimedia content items.

In one or more embodiments, as shown in FIG. 3B, the content item manager 106 may provide the multimedia content item preview 318b based on a digital video stored on the computing device 300. For example, in one or more embodiments, the content item manager 106 may provides a preview of a digital video that includes at least a portion of the digital video that auto plays within the multimedia content item display area 316. For instance, a illustrated in FIG. 3B, multimedia content item preview 318b, may be a portion of a digital video that auto plays within the multimedia content item display area 316. In one or more embodiments, the portion of the digital video that auto plays may only be a few seconds long. In one or more alternative embodiments, the portion of the digital video that auto plays may be a percentage of the total length of the digital video (e.g. a preview consisting of 10% of a 60 second digital video may be 6 seconds long). Alternatively, the entire digital video can auto play within the multimedia content item display area 316.

As with the multimedia content item preview 318a discussed above, the content item manager 106 may crop the multimedia content item preview 318b such that the preview 318b is square and sized for presentation in the multimedia content item display area 316. In one or more embodiments, the content item manager 106 may crop and tailor multimedia content item previews 318a, 318b such that the previews 318a, 318b are the same size within the multimedia content item display area 316, even though the multimedia content items associated with the previews 318a, 318b are of differing sizes.

As shown, the user interface manager 102 may display the multimedia content item display area 316 such that the display area 316 is horizontally scrollable within the messaging graphical user interface 304. For example, as shown in FIG. 3C, the user input detector 104 may detect a user interaction of the finger 314 of a user's hand within the multimedia content item display area 316. For instance, the detected user interaction may be a swipe touch gesture of the finger 314 moving across the touch screen display 302 along the direction of the arrow 322. In one or more embodiments, in response to the detected touch gesture, the user interface manager 102 may update the multimedia content item display area 316 to appear to be scrolling along the direction of the arrow 322. In a preferred embodiment, the multimedia content item preview 318b will continue to auto play through the horizontal scroll.

As discussed above, in one or more embodiments, the content item manager 106 may provide content item previews of multimedia content items likely to be selected by the user. For example, the content item manager 106 may provide content item previews of the most recent multimedia content items stored on the computing device 300. For example, in one embodiment, the content item manager 106 may provide content item previews of any multimedia content items stored on the computing device 300 within the last 24 hours. In an alternative embodiment, the content item manager 106 may provide content item previews of a predetermined number of content items (e.g., 10, 20, 30) stored on the computing device 300.

In yet additional alternative embodiments, the content item manager 106 may provide content item previews based on other criteria besides recentness. For example, the electronic messaging system 100 can provide content item previews including participants in conversation included in the communication thread 306. Alternatively, the content item manager 106 may provide content item previews of multimedia items were created or "taken" at a particular location (e.g., all the pictures and videos taken at the lake house). In still further embodiments, the content item manager 106 may provide content item previews related in some way to content of the messages in the communication thread 306.

In one or more embodiments, the user interface manager 102 may update the messaging graphical user interface 304 to include a camera roll in response to a detected over-scroll within the multimedia content item display area 316. For example, as shown in FIG. 3D, the content item manager 106 may have provided only the multimedia content items previews 318a and 318b for display in the multimedia content item display area 316. Accordingly, the multimedia content item preview 318b is the last preview displayed in the multimedia content item display area 316. In one or more embodiments, the user interface manager 102 may indicate the multimedia content item preview 318b is the last preview in the multimedia content item display area 316 by displaying a blank area 324 to right of the multimedia content item preview 318b. Additionally or alternatively, the user interface manager 102 may indicate the multimedia content item preview 318b is the last preview by providing an automatic stop to a scrolling motion once the content preview 318b is reached.

In one or more embodiments, the user input detector 104 may detect a swipe gesture of the user's finger 314 across the multimedia content item display area 316 along the direction of the arrow 322. In response to the detected swipe gesture, in one or more embodiments, the user interface manager 102 may sequentially display the content item previews. In one or more embodiments, the user interface manager 102 may provide a camera roll of the computing device in response to a detected over-scroll. As illustrated in FIG. 3D, an over-scroll occurs when a user continues to horizontally scroll the multimedia content item display area 316 along the direction of arrow 322 beyond the last content item preview 318b, the user interface manager 102 updates the messaging graphical user interface 304 to include a camera roll of the computing device 300.

Figure 3E:
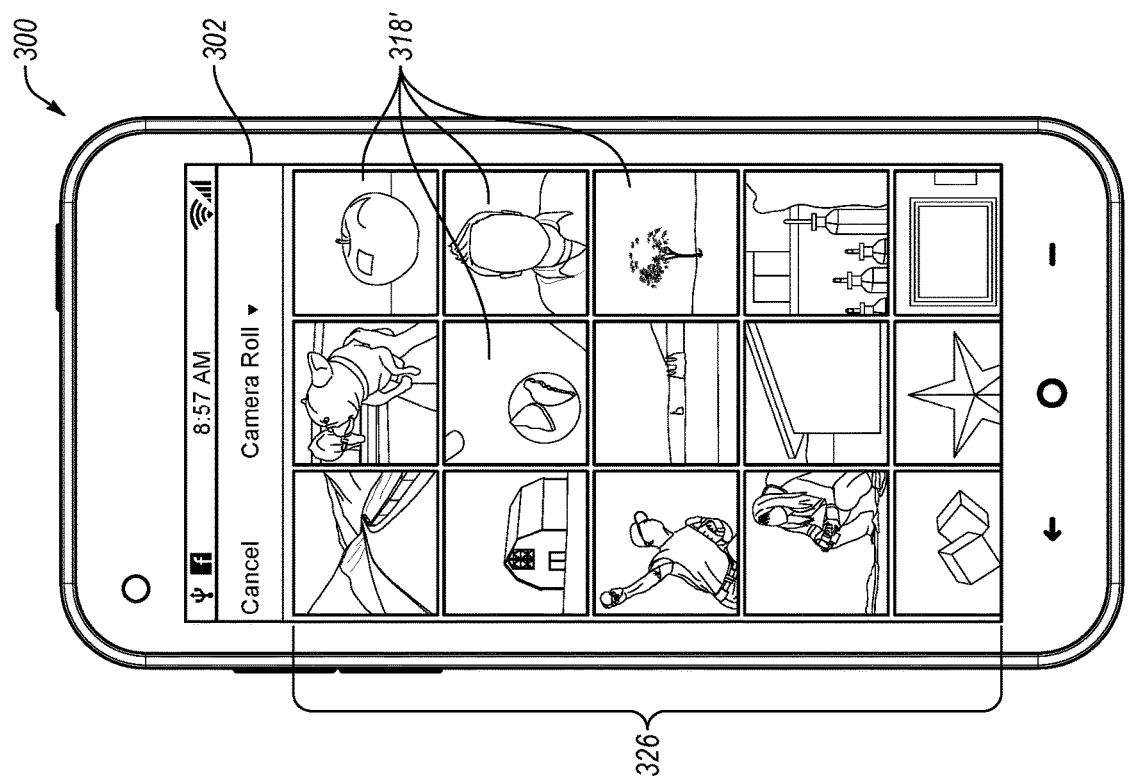

For example, as illustrated in FIG. 3E, upon the detected over-scroll, the user interface manager 102 displays a camera roll 326. In one or more embodiments, the camera roll 326 provides a content item preview 318' for each multimedia content item stored on the computing device 300. In one or more embodiments, the content item manager 106 may crop and tailor each camera roll preview 318' in the same manner as described with regard to the multimedia content item previews 318a and 318b above.

Additionally, in one or more embodiments, if any of the camera roll previews 318' is associated with a digital video multimedia content item, the content item manager 106 may provide a portion of the digital video that auto plays from within the camera roll 326. Accordingly, in one or more embodiments, the user interface manager 102 may display the camera roll 326 such that some of the camera roll content item previews 318' are still images (i.e., based on digital photograph multimedia items) and some of the camera roll content item previews 318' are auto playing video clips (i.e., based on digital video multimedia items). In one or more alternative embodiments, the content item manager 106 may not provide any specialized content item previews for the camera roll. Rather, in an alternative embodiment, the user interface manager 102 may simply display a minimized version of each digital picture and/or a minimized version of the first frame of each digital video within the camera roll 326.

As shown in FIG. 3E, in one or more embodiments the camera roll 326 can occupy the entire touch screen display 302. In other words, the display of the camera roll 326 can cause a navigation away from the communication thread 306. In alternative embodiments, the user interface manager 102 can provide the camera roll 326 within the area of the messaging user interface 304 previously occupied by the content item display area 316. In such embodiments, the user can access the camera roll 326 without navigating away from the communication thread 306.

In one or more embodiments, a user may select a content item preview either from the camera roll 326 (i.e., one of the camera roll previews 318' of FIG. 3E) or from the multimedia content item display area 316, as shown in FIG. 3F. For example, as illustrated in FIG. 3F, the user input detector 104 may detect a user selection of the multimedia content item preview 318c from the multimedia content item display area 316. For instance, the user input detector 104 may detect a tap touch gesture of the finger 314 of the user with the content item preview 318c. In one or more alternative embodiments, the user input detector 104 may detect other types of user input such as a spoken command, an upward swipe touch gesture, or any other suitable type of user input.

Upon detection of a selection of a content item preview 318c, the communication manager 108 may send the multimedia content item associated with the content item preview 318a to one or more co-users. For example, the communication manager 108 may send the multimedia content item to the communication server 208, which may then forward the multimedia content item to one or more computing devices 204 associated with one or more intended recipients. In that case, the user interface manager 102 may also add the multimedia content item to the communication thread 306.

Figure 3H:
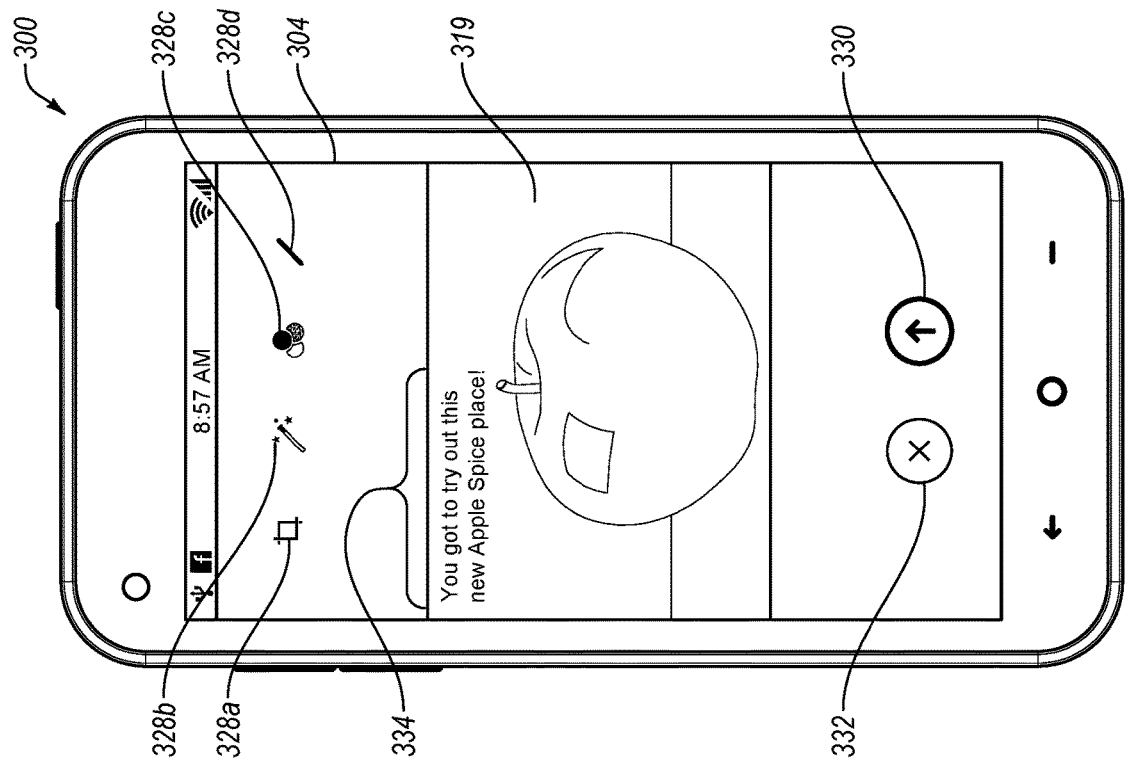
Figure 3G:
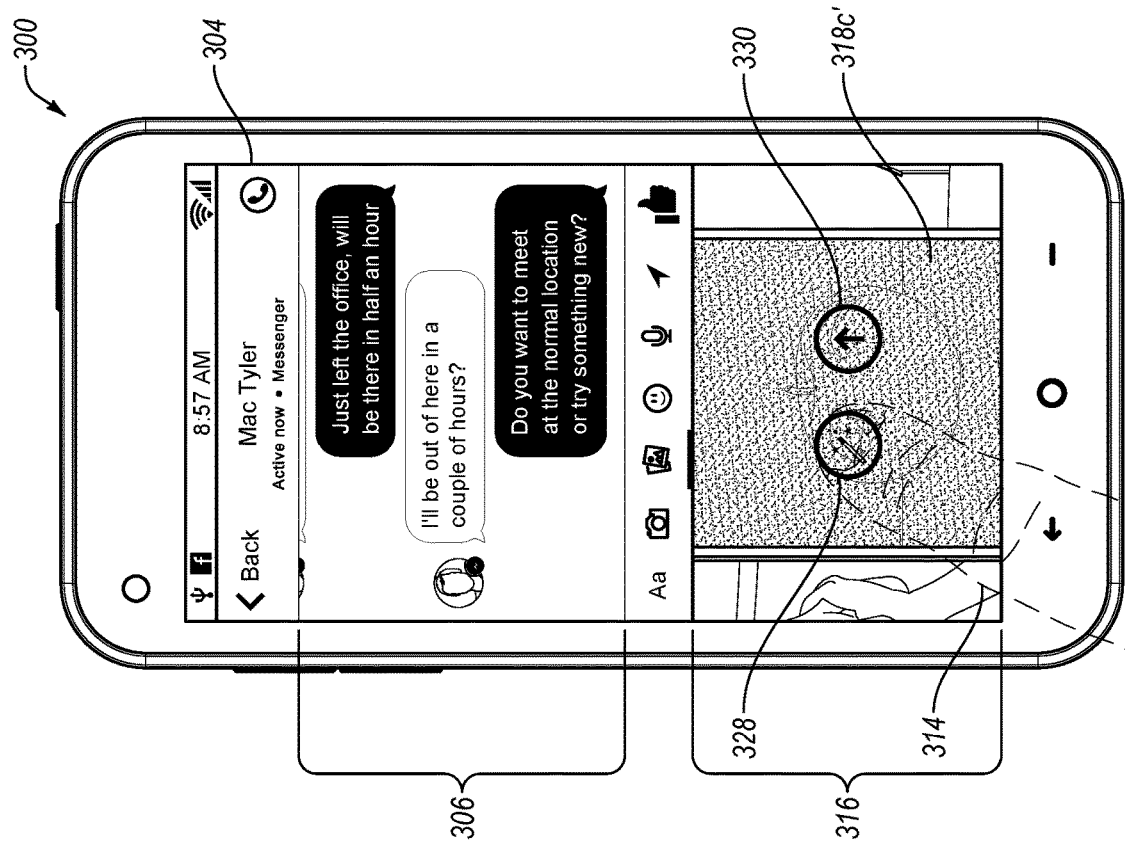

Alternatively, in response to selection of the multimedia content item preview 318c, the user interface manager 102 may alter the display of the content item preview 318c so as to indicate the selection of the content item preview 318c. For example, in response to the selection of the multimedia content item preview 318c, the user interface manager 102 may present a blurred version of the content item preview 318c', as shown in FIG. 3G. In one or more alternative embodiments, the user interface manager 102 may alter the selected multimedia content item preview 318c in other ways in order to indicate the selection. For example, in one or more alternative embodiments, the user interface manager 102 may alter the color scheme of the selected content item preview 318c, may black out the selected preview 318c, or may alter the selected content item preview 318c in any other way suitable for this purpose. Furthermore, in one or more embodiments the selected content item preview 318c can also be enlarged or zoomed in.

Additionally, in response to a selection of the multimedia content item preview 318c, the user interface manager 102 may also present one or more controls overlaid on the selected preview 318c'. For example, as illustrated in FIG. 3G, in response to the selection of the preview 318c, the user interface manager 102 may overlay an edit control 328 and a send control 330 on the selected multimedia content item preview 318c'. In one or more embodiments, the user interface manager 102 may overlay other or additional controls on the selected preview 318c'. For instance, in one embodiment, the user interface manager 102 may also overlay a delete control over the selected preview 318c'.

In response to a detected selection of a delete control, the content item manager 106 may remove the preview 318c from the multimedia content item display area 316. Additionally or alternatively, the content item manager 106 may permanently delete the multimedia content item associated with the preview 318c from the computing device 300. In one or more embodiments, the content item manager 106 may be configurable by a user in order to specify the actions taken with regard to the controls including the edit control 328, the send control 330, and the delete control.

In response to a detected selection of the send control 330, the communication manager 108 may send the multimedia content item associated with the selected preview 318c' to one or more co-users. Additionally, in one or more embodiments, the user interface manager 102 may also add the multimedia content item associated with the selected preview 318c' to the communication thread 306. In one or more embodiments, a user may unselect the selected preview 318c' simply by tapping anywhere else on the messaging graphical user interface 304.

The content item manager 106 may provide the multimedia content item associated with the multimedia content item preview 318c' for editing in response to a detected selection of the edit control 328. For example, as shown in FIG. 3G, the user input detector 104 may detect a user interaction (e.g., tap touch gesture) of a user's finger 314 with the edit control 328. As shown in FIG. 3H, the user interface manager 102 may present the multimedia content item 319 associated with the selected preview 318c' for editing in response to the detected user interaction. In one or more embodiments, the user interface manager 102 may also present a variety of editing controls within the messaging graphical user interface 304. For example, the user interface manager 102 may display a crop editing control 328a (i.e., allows a user to crop the multimedia content item 319), an auto-edit control 328b (i.e., performs preconfigured edits to the multimedia content item 319), a color edit control 328c (i.e., allows a user to edit the colors of the multimedia content item 319), and a writing edit control 328d (i.e., allows a user to add text or other drawn effects to the multimedia content item 319). In one or more alternative embodiments, the user interface manager 102 may display other or additional edit controls while the multimedia content item 319 associated with the selected preview 318a' is available for editing.

In one or more embodiments, the content item manager 106 may allow edits to a copy of a multimedia content item 319, rather than allowing edits to the original multimedia content item 319. This feature allows a user to send a copy of a multimedia content item to one or more co-users that has been edited only for purposes related to a specific communication session. Thus, in one or more embodiments, edits made within the electronic messaging system 100 may not be reflected to an original copy of the content item stored on the computing device 300.

The content item manager 106 may receive one or more edits to multimedia content item 319 from a user. For example, as shown in FIG. 3H, a user's finger 314 may perform an edit 334. In the embodiment shown, the edit 334 is writing added to the multimedia content item 319, in connection with a selection of the writing edit control 328d. In additional alternative embodiments, the content item manager 106 may receive further edits to the multimedia content item 319 in accordance with any of the edit controls 328a-d described above.

Additionally, as shown in FIG. 3H, the user interface manager 102 may present additional controls while the multimedia content item 319 is available for editing. For example, the user interface manager 102 may also present a send control 330 and a cancel control 332. In one or more embodiments, a detected selection of the send control 330 may cause the communication manager 108 to send the multimedia content item 319 along with the edit 334 to one or more co-users. Additionally, in one or more embodiments, a detected selection of the cancel control 332 may cause the content item manager 106 to discard any edits made to the multimedia content item 319. In an alternative embodiment, the user interface manager 102 may also present a save control while the multimedia content item 319 is available for editing. In one or more embodiments, a detected selection of the save control may cause the content item manager 106 to save the multimedia content item 319 along with the edits 334 to the computing device 300.

Figure 3I:
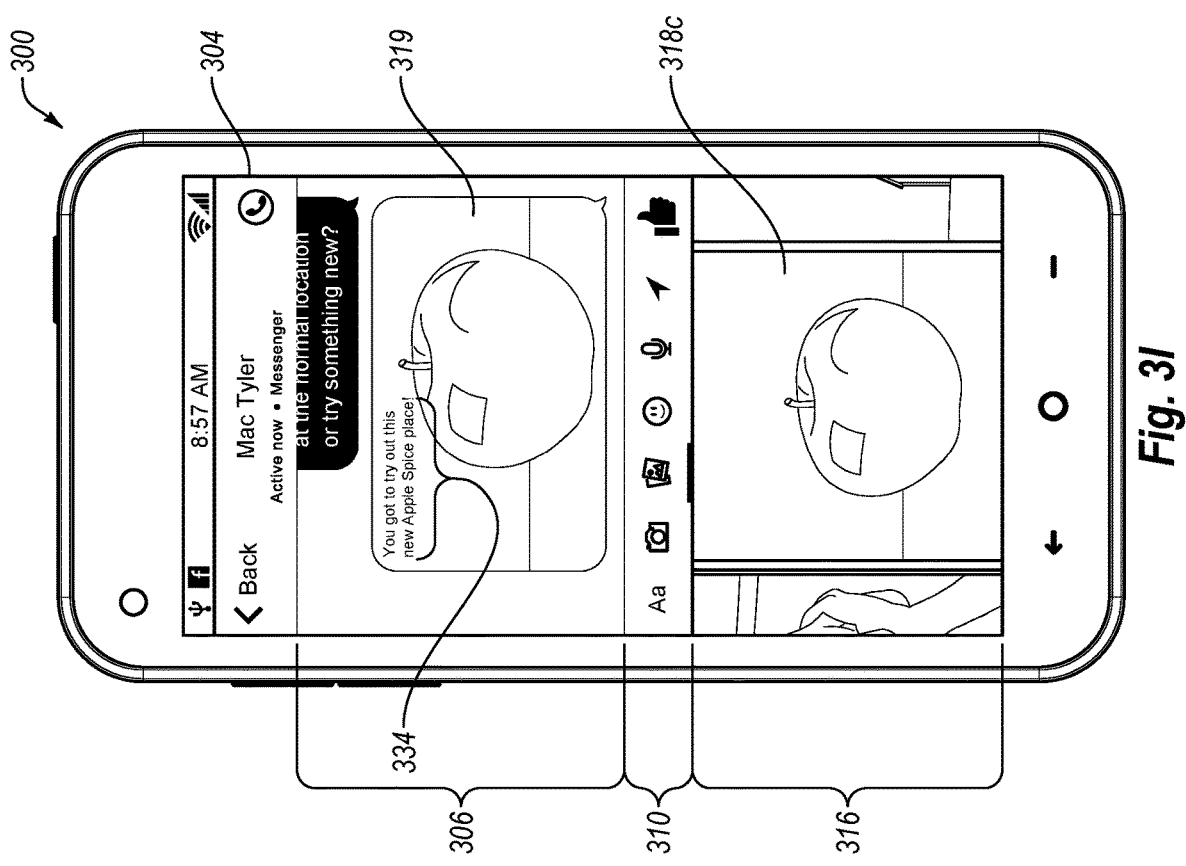

In one or more embodiments, the user interface manager 102 may again display the communication thread 306, the message input control palette or toolbar 310, and the multimedia content item display area 316 in response to a detected selection of the send control 330, the cancel control 332, or the save control as described with regard to FIG. 3H. For example, as shown in FIG. 3I, in response to a detected selection of the send control 330, the user interface manager 102 can display the communication thread 306, the message input control palette or toolbar 310, and the multimedia content item display area 316 within the messaging graphical user interface 304. In one or more embodiments, as shown in FIG. 3I, the user interface manager 102 may automatically add the multimedia content item 319 with the edit 334 to the communication thread 306 in response to the detected selection of the send control 330.

In one or more embodiments, the user interface manager 102 may display the multimedia content item preview 318c within the multimedia content item display area 316 such that the content item preview 318c does not reflect any edits. For example, because the content item manager 106 provided a copy of the content item 319 (shown in FIG. 3G) for editing, the multimedia content item associated with the content item preview 318c was not affected by the edits 334. Accordingly, as shown in FIG. 3I, the user interface manager 102 displays the content item preview 318c unchanged within the multimedia content item display area 316. In one or more alternative embodiments, the content item manager 106 may provide the original multimedia content item for editing, rather than a copy 319. In that alternative embodiment, the user interface manager 102 may display the preview 318c including the edits 334 within the multimedia content item display area 316.

As shown in FIG. 3I, when sent to one or more co-users and when added to the communication thread 306, the content item 319 can have a size configured for display within a communication thread 306. In particular, the content item 319 can occupy less than the entire communication thread 306 both in a vertical direction and a horizontal direction. By not occupying the total vertical area of the communication thread 306, the communication thread 306 can display both the content item 319 and one or more messages as shown by FIG. 3I. Along related lines, by not occupying the total horizontal area of the communication thread 306, the content item 319 can be positioned on one side of the communication thread 306 so as to indicate whether the content item 319 was a sent or received message.

FIGS. 3A-3I illustrate the process for selecting and editing a digital photograph multimedia content item for inclusion in a communication session. As discussed above, the electronic messaging system 100 also allows a user to select and edit a digital video multimedia content item for inclusion in a communication session. The process for selecting and editing a digital video will now be discussed in relation to FIGS. 4A-4E.

Figure 4B:
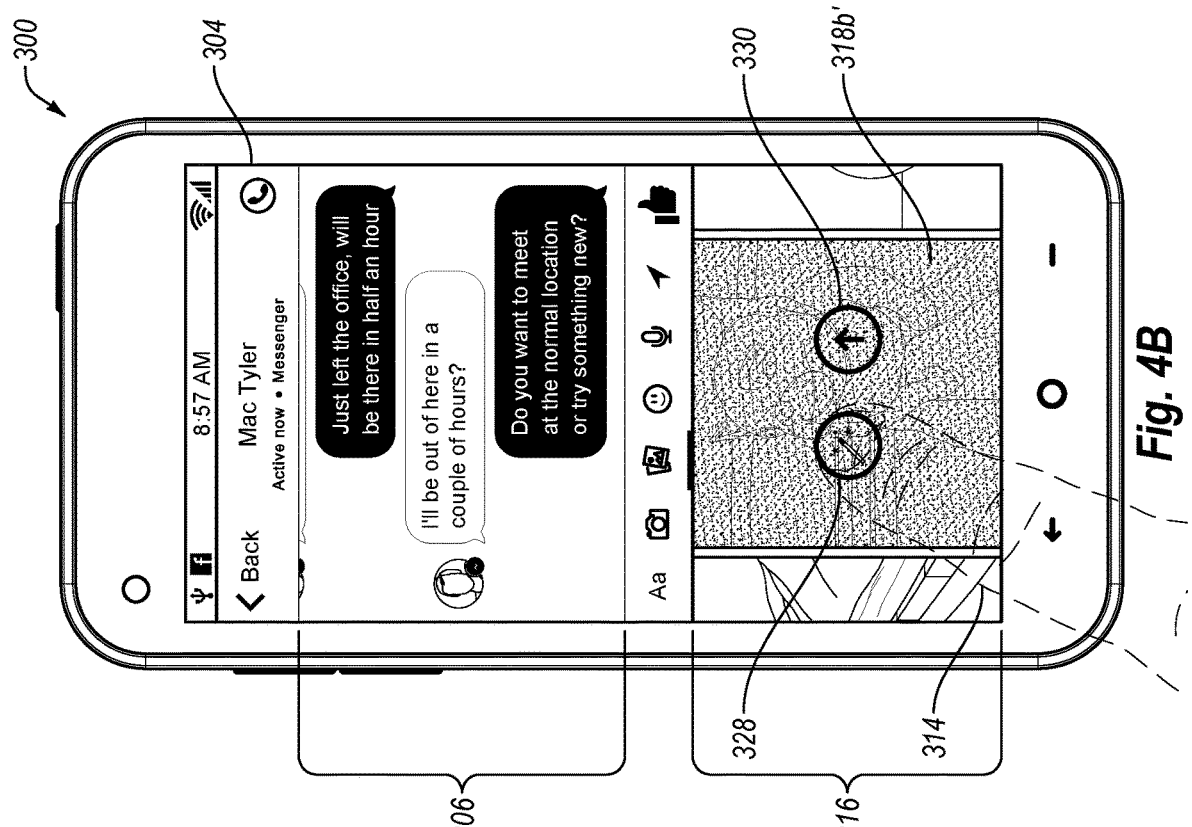
FIGS. 4A-4E illustrate user interfaces for selecting, editing, and sending a multimedia content item in accordance with one or more additional embodiments.
Figure 4A:
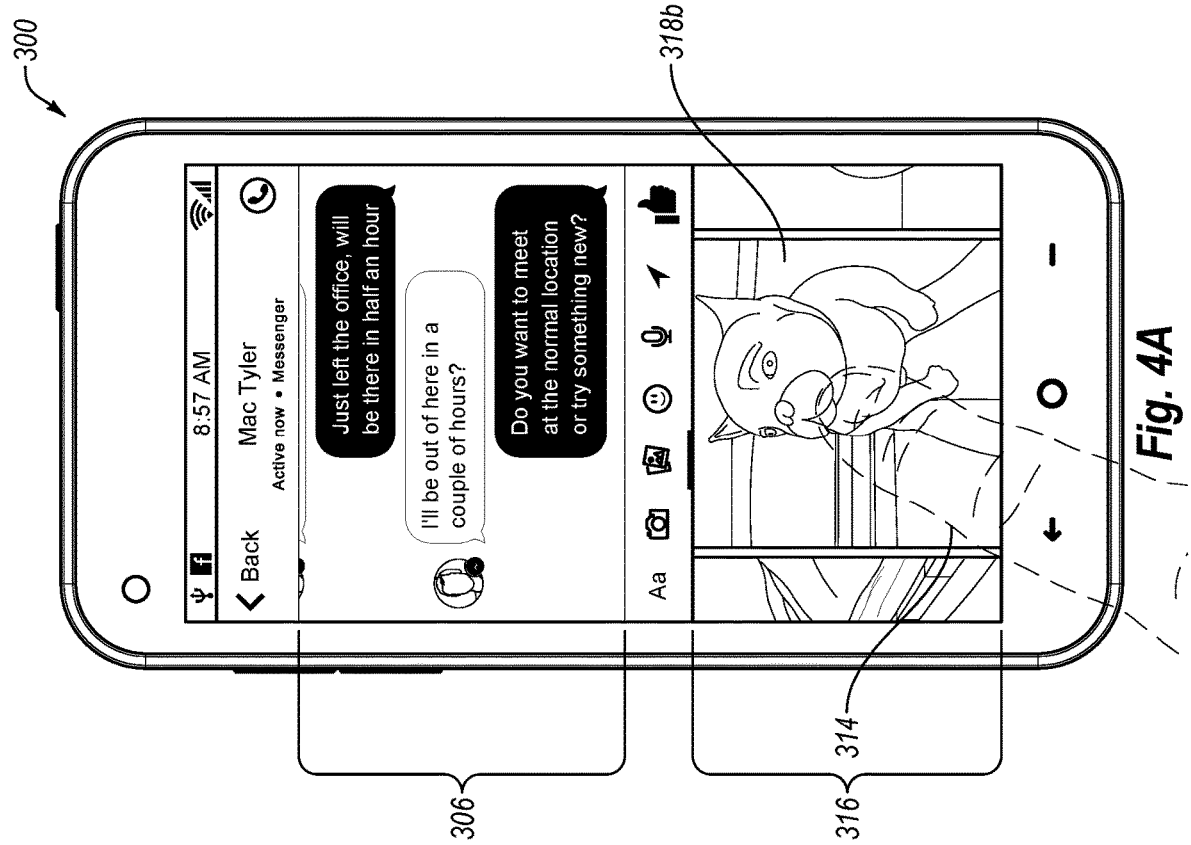

As described above, the user input detector 104 may detect a selection of a multimedia content item preview 318b from with the multimedia content item display area 316. For example, as shown in FIG. 4A, the user input detector 104 may detect a tap touch gesture of the user's finger 314 on the content item preview 318b. In one or more alternative embodiments, the detected selection may be by way of another type of user interaction, such as a press-and-hold touch gesture, a spoken command, or any other type of user interaction suitable for this purpose. In one or more embodiments, as described above, the multimedia content item associated with the content item preview 318b may be a digital video.

As discussed above with regard to FIG. 3G, the communication manager 108 may immediately send the digital video associated with the multimedia content item preview 318b in response to a particular user interaction. For example, the communication manager 108 may immediately send the digital video associated with the content item preview 318b to one or more co-users upon detection of a selection of the content item preview 318b. Additionally, the user interface manager 102 may immediately add the digital video to the communication thread 306 in response to detection of a selection of the content item preview 318b.

Additionally or alternatively, in response to a touch gesture selection of the multimedia content item preview 318b, the user interface manager 102 may alter the display of the content item preview 318b so as to indicate the selection of the content item preview 318b. For example, in response to the selection of the multimedia content item preview 318b in FIG. 4A, the user interface manager 102 may present a blurred version of the preview 318b', as shown in FIG. 4B. As discussed above, the content item preview 318b' of a digital video is a portion of the digital video that auto plays within the multimedia content item display area 316. Accordingly, in response to a selection of the content item preview 318b', the user interface manager 102 may display a blurred portion of the digital video that auto plays within the multimedia content item display area 316. In one or more alternative embodiments, in response to a selection of the content item preview 318b', the user interface manager may display only a blurred single frame from the digital video.

Additionally in response to a selection of the multimedia content item preview 318b, the user interface manager 102 may also present one or more controls overlaid on the selected preview 318b', as illustrated in FIG. 4B. For example, as illustrated in FIG. 4B, in response to the selection of the preview 318a in FIG. 4A, the user interface manager 102 may overlay the edit control 328 and the send control 330 on the selected multimedia content item preview 318b'. In one or more embodiments, the user interface manager 102 may overlay other or additional controls on the selected content item preview 318b'. For instance, in one embodiment, the user interface manager 102 may also overlay a delete control over the selected preview 318b'.

In response to a detected selection of the send control 330, the communication manager 108 may send the multimedia content item associated with the selected content item preview 318b' to one or more co-users. Additionally, in one or more embodiments, the user interface manager 102 may also add the multimedia content item associated with the selected content item preview 318b' to the communication thread 306. In one or more embodiments, a user may unselect the selected content item preview 318b' simply by tapping anywhere else on the messaging graphical user interface 304.

As described above, the content item manager 106 may provide the multimedia content item associated with the multimedia content item preview 318b' (or a copy thereof) for editing in response to a detected selection of the edit control 328. For example, as shown in FIG. 4B, the user input detector 104 may detect a user interaction of the user's finger 314 with the edit control 328. In one or more embodiments, the detected user interaction may be a tap touch gesture. In one or more alternative embodiments, the detected user interaction may be an upward swipe touch gesture, a spoken command, or another type of user input suitable for this purpose.

Figure 4D:
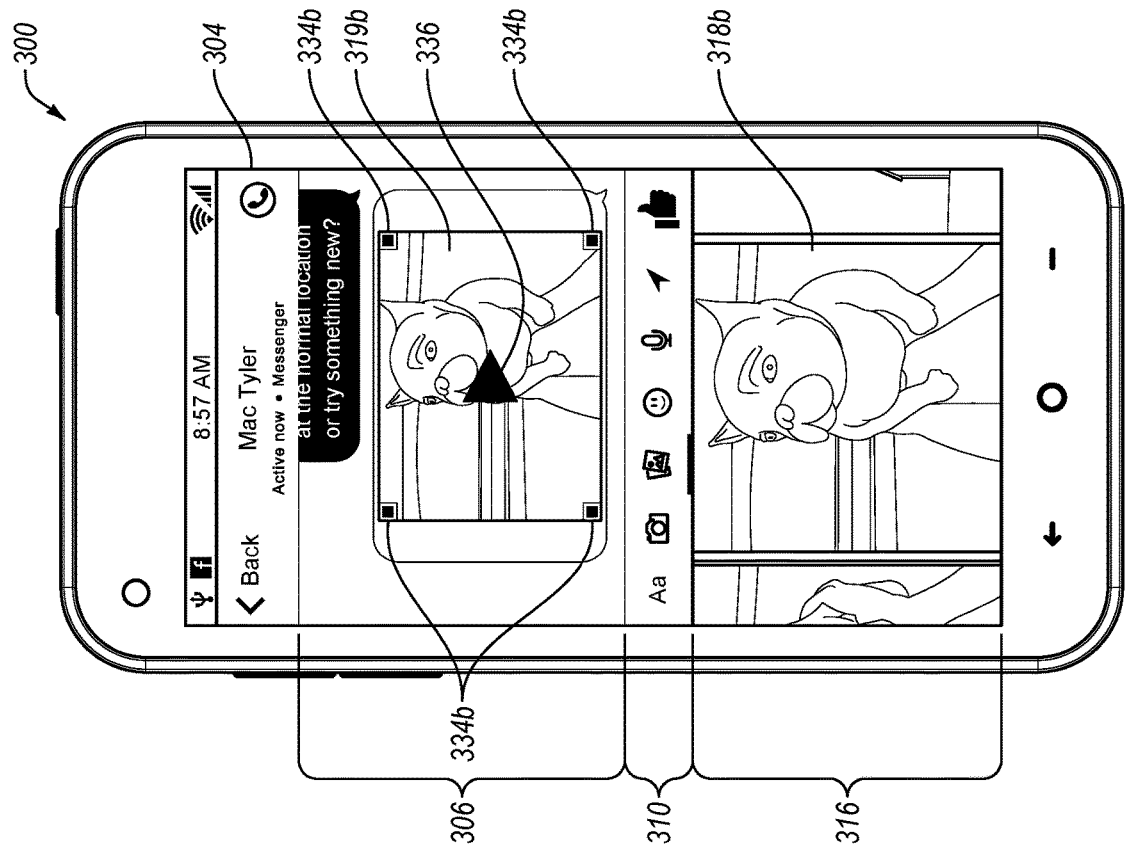
Figure 4C:
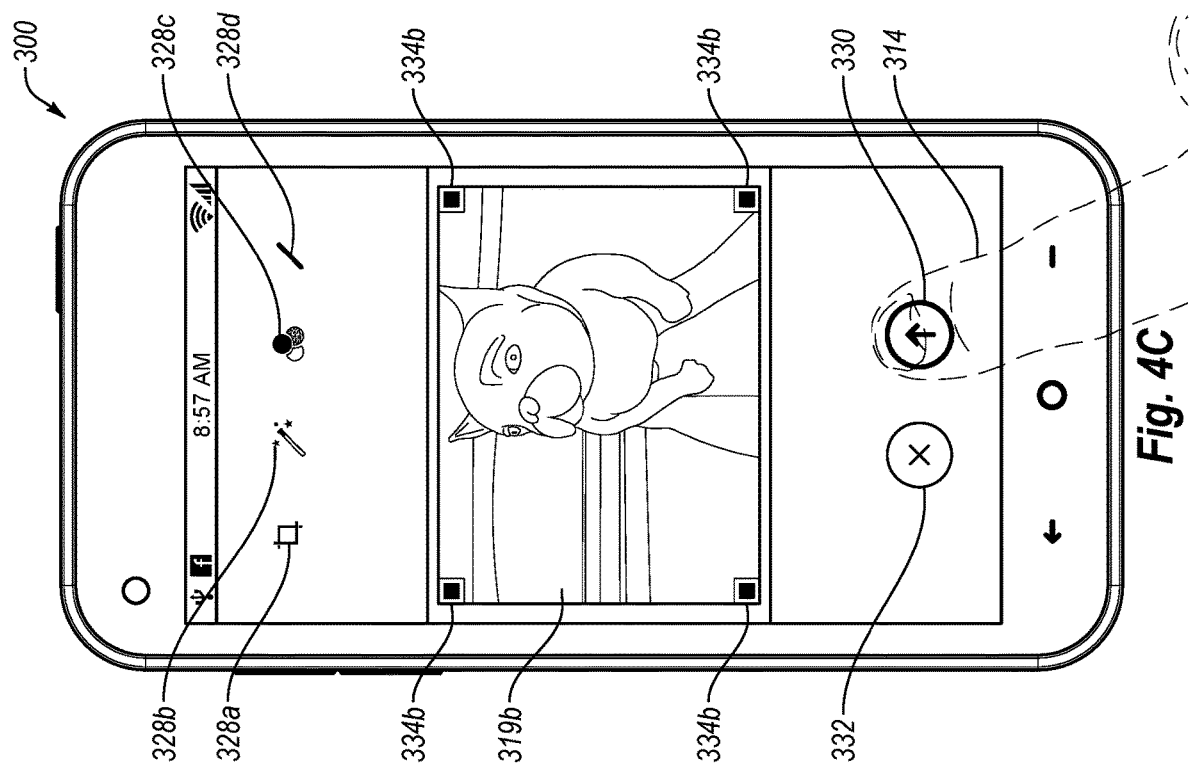

As shown in FIG. 4C, the user interface manager 102 may present the content item 319b associated with the selected preview 318b' for editing within the messaging graphical user interface 304 in response to the detected user interaction. In one or more embodiments, and as described above, the user interface manager 102 may also present a variety of editing controls within the messaging graphical user interface 304. For example, the user interface manager 102 may display the crop editing control 328a, the auto-edit control 328b, the color edit control 328c, and the writing edit control 328d. In one or more alternative embodiments, the user interface manager 102 may display other or additional edit controls as described above.

In one or more embodiments, the editing controls 328a-d may take on different functionality depending on the type of multimedia content item currently available for editing. For example, with regard to FIG. 3H, the multimedia content item type was a digital photograph. Accordingly, in one or more embodiments associated with a digital photograph, the crop editing control 328a may function to remove portions of the digital photograph, thus changing the displayed portion of the digital photograph. However, with regard to FIG. 4C, the multimedia content item type is a digital video. As such, in one or more embodiments associated with a digital video, the crop editing control 328a may function to remove portions of the digital video, thus changing the runtime of the digital video. In one or more embodiments, the other editing controls 328b-d may have similarly alterable functionalities depending on the multimedia content item type.

As shown by FIG. 4C, the content item manager 106 may receive one or more edits to the content item 319b via one or more touch gestures. In the embodiment shown, the content item manager 106 has received an edit 334b changing a display property of the content item 319b. In particular, the edit 334b includes the addition of a border around the content item 319b In additional alternative embodiments, the content item manager 106 may receive further edits to the content item 319b in accordance with any of the edit controls 328a-d described above.

Additionally, as shown in FIG. 4C, the user interface manager 102 may present additional controls while the content item 319b is available for editing. For example, the user interface manager 102 may also present the send control 330 and the cancel control 332. In one or more embodiments, a detected selection of the send control 330 may cause the communication manager 108 to send the content item 319b along with the edits 334b to one or more co-users. Additionally, in one or more embodiments, a detected selection of the cancel control 332 may cause the file manager 108 to discard any edits made to the content item 319b of the multimedia content item. In an alternative embodiment, the user interface manager 102 may also present a save control while the copy 319b is available for editing. In one or more embodiments, a detected selection of the save control may cause the content item manager 106 to save the content item 319b along with the edits 334b to the computing device 300.

In one or more embodiments, the user interface manager 102 may display the communication thread 306, the message input control palette or toolbar 310, and the multimedia content item display area 316 in response to a detected selection of the send control 330, the cancel control 332, or the save control as described with regard to FIG. 4C. For example, as shown in FIG. 4C, the user input detector 104 may detect a touch gesture performed by the user's finger 314 on the send control 330. In response to a detected selection of the send control 330, in one or more embodiments, the user interface manager 102 may display the communication thread 306, the message input control palette or toolbar 310, and the multimedia content item display area 316 within the messaging graphical user interface 304, as shown in FIG. 4D. In one or more embodiments, as shown in FIG. 4D, the user interface manager 102 may automatically add the content item 319b of the multimedia content item with the edits 334b to the communication thread 306 in response to the detected selection of the send control 330. As described above, the content item preview 318b may not include the edits 334b made to the content item 319b.

As described above, the content item manager 106 may also package the content item 319b of the multimedia content item with the edits 334b such that it may be played from within the communication thread 306. For example, as shown in FIG. 4D, the content item manager 106 has added the content item 319 with the edits 334b and a playback control 336 to the communication thread 306. In one or more alternative embodiments, the playback control 336 may further include a time remaining indicator, a pause button, or any other additional controls suitable for a video.

Figure 4E:
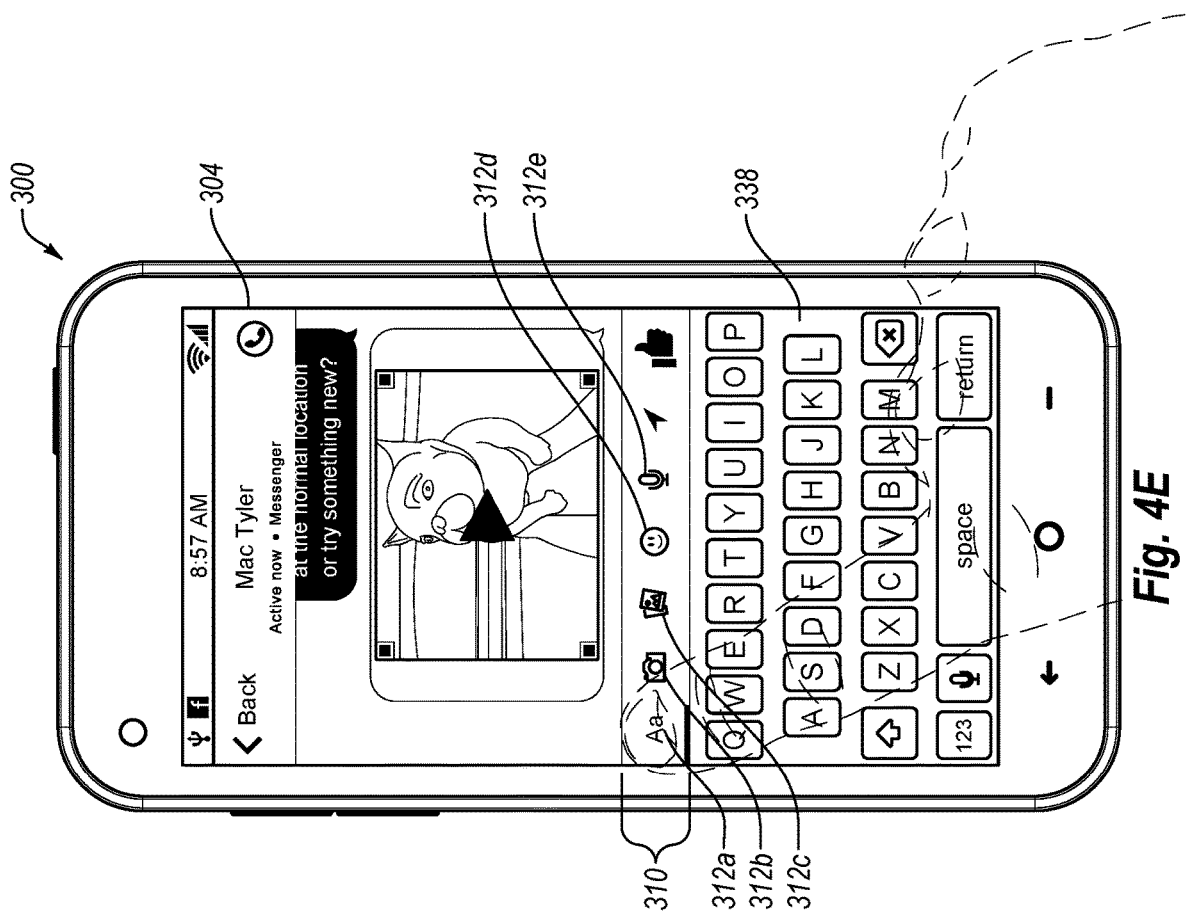

In response to a detected user interaction, the user interface manager 102 may replace the multimedia content item display area 316 with another control. For example, as illustrated in FIG. 4E, the user input detector 104 may detect a user interaction of the user's finger 314 interacting with the text input control 312a within the message input control palette or toolbar 310. In one or more embodiments, in response to this detected selection of the text input control 312a, the user interface manager 102 may replace the multimedia content item display area 316 with a touch screen display keyboard 338. In one or more alternative embodiments, the user interface manager 102 may replace the multimedia content item display area 316 with other types of controls in response to the detected selection of any of the input controls 312a-312b.

Figure 5:
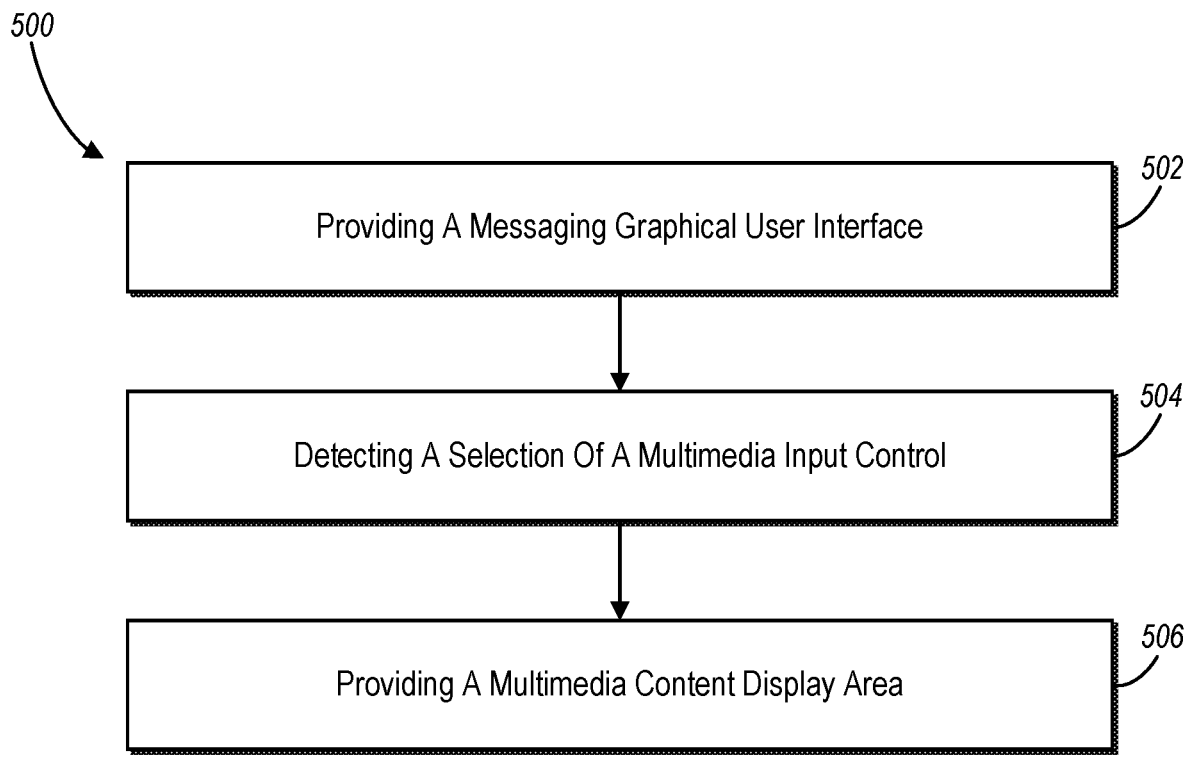
FIG. 5 illustrates a flowchart of a series of acts in a method of selecting and including multimedia content items in an electronic message in accordance with one or more embodiments.
Figure 6:
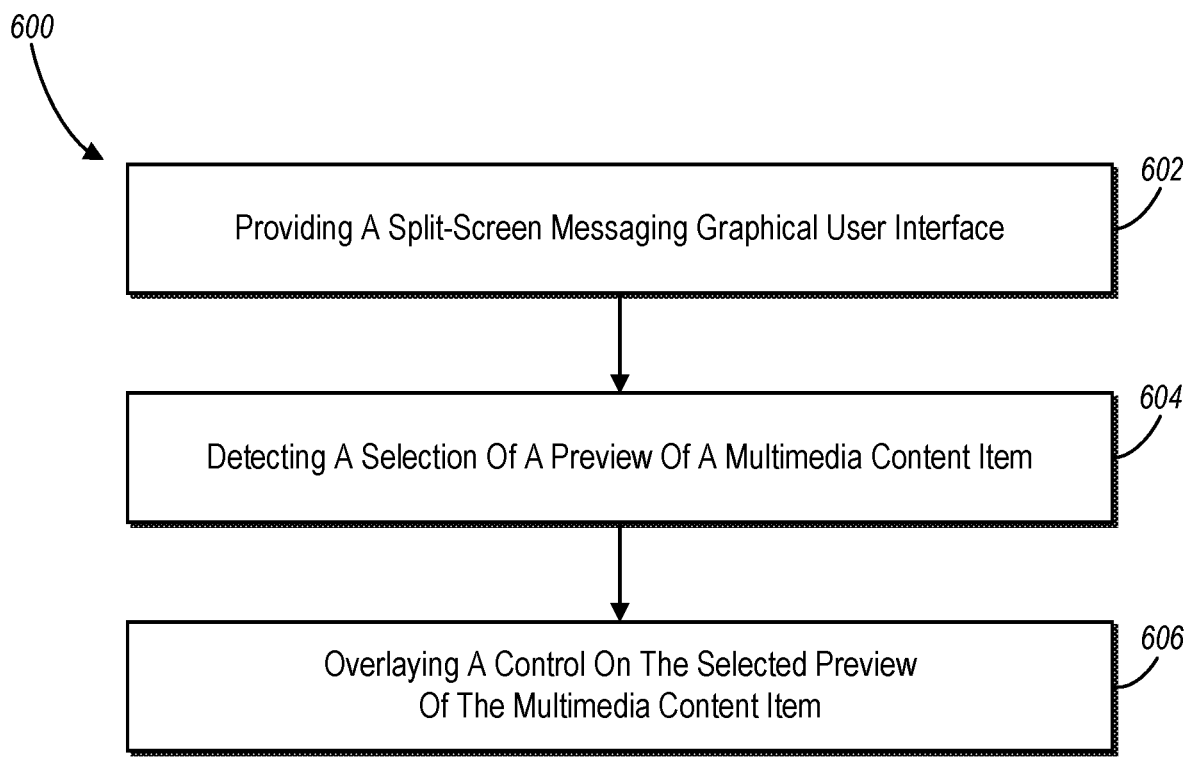
FIG. 6 illustrates a flowchart of a series of acts in another method of selecting and including multimedia content items in an electronic message in accordance with one or more embodiments.

FIG. 1-4E, the corresponding text, and the examples, provide a number of different systems and devices for selecting and including multimedia content items in a communication session. In addition to the foregoing, embodiments of the present invention can also be described in terms of flowcharts comprising acts and steps in a method for accomplishing a particular result. For example, FIGS. 5 and 6 illustrate flowcharts of exemplary methods in accordance with one or more embodiments of the present invention. The methods described in relation to FIGS. 5 and 6 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of one example method 500 of selecting and including multimedia content items in a communication session. The method 500 includes an act 502 of providing a messaging graphical user interface. In particular, the act 502 can involve providing, on a client device, a messaging graphical user interface 304. In one or more embodiments, the messaging graphical user interface 304 may include a communication thread 306 in a first portion. In one or more embodiments, the communication thread may include a plurality of electronic messages 308a, 308b exchanged between a user and one or more co-users.

The method 500 further includes an act 504 of detecting a selection of a multimedia input control. In particular, the act 504 can include detecting a tap touch gesture selection of the multimedia input control 312c. In one or more embodiments, detecting a selection of a multimedia input control 312c can include detecting the selection of the multimedia input control 312c from a palette of input controls 310.

The method 500 also includes an act 506 of providing a multimedia content item display area. In particular, the act 506 can involve, in response to the detected selection of the multimedia input control 312c, providing a multimedia content item display area 316 in a second portion of the messaging graphical user interface 304. In one or more embodiments, the multimedia content item display area 316 may provide a preview 318a, 318b of one or more multimedia content items stored on the client device 300 available for sending as an electronic message 308a, 308b.

In one or more embodiments, providing the multimedia content item display area 316 may include providing a preview 318a, 318b of one or more recently stored multimedia content items. For example, one or more recently stored multimedia content items may include multimedia items that were stored within a given time limit, or window of time. Additionally, in one or more embodiments, the one or more multimedia content items stored on the client device 300 available for sending as an electronic message 308a, 308b may include one or more digital photographs or digital videos. Furthermore, providing a preview 318a, 318b of one or more multimedia content items may include providing a digital video that auto plays within the second portion of the messaging graphical user interface 304.

Additionally, in one or more embodiments, the provided multimedia content item display area 316 may be horizontally scrollable. Furthermore, in one or more embodiments, the method 500 may also include detecting a horizontal over-scroll of the horizontally scrollable multimedia content item display area 316. In response to the detected horizontal over-scroll, the method 500 may include displaying a camera roll 326 associated with the client device 300.

The method 500 may further include cropping the preview 318a, 318b of each of the one or more multimedia content items stored on the client device 300 available for sending as an electronic message 308a, 308b. In one or more embodiments, cropping the preview 318a, 318b of each of the one or more multimedia content items may further include tailoring the cropped preview 318a, 318b of each of the one or more multimedia content items to an aspect ratio of the second portion of the messaging graphical user interface 304. For example, in one or more embodiments, tailoring the cropped preview 318a, 318b of each of the one or more multimedia content items to an aspect ratio of the second portion of the messaging graphical user interface 304 may include displaying the previews 318a, 318b in the second portion of the messaging graphical user interface 304 such that the previews 318a, 318b are square.

The method 500 may also include detecting a selection of a preview 318a, 318b of a multimedia content item provided in the multimedia content item display area 316 in the second portion of the messaging graphical user interface 304. In one or more embodiments, in response to the detected selection of the preview 318a, 318b of the multimedia content item, the method can involve sending the multimedia content item 319 corresponding to the selected preview 318a, 318b to one or more co-users. Additionally, in one or more embodiments, in response to sending the multimedia content item 319, the method 500 may include adding the multimedia content item 319 to the communication thread 306 in the first portion of the messaging graphical user interface 304.

FIG. 6 illustrates a flowchart of a method 600 of selecting and including multimedia content items in a communication session. The method 600 includes an act 602 of providing a split-screen messaging graphical user interface. In particular, the act 602 can involve providing a split-screen messaging graphical user interface 304 including two portions. In one or more embodiments, the first portion of the split-screen messaging graphical user interface 304 may include a communication thread 306 including a plurality of electronic messages 308a, 308b exchanged between a user and one or more co-users. Additionally in one or more embodiments, the second portion of the split-screen messaging graphical user interface 304 may include a multimedia content items display 316 including a preview 318a, 318b of one or more multimedia content items. In one or more embodiments, the preview 318a, 318b of one or more multimedia content items may be tailored to an aspect ratio of the second portion or the first portion of the messaging graphical user interface 304.

The method 600 further includes an act 604 of detecting a selection of a preview of a multimedia content item. In particular, the act 604 can involve detecting a selection of a preview 318a, 318b of a multimedia content item from the multimedia content item display 316. For example, in one or more embodiments, detecting a selection of a preview 318a, 318b of a multimedia content items may include detecting a tap touch gesture interacting with the multimedia content item.

The method 600 further includes an act 606 of overlaying a control on the selected preview of the multimedia content item. In particular, the act 606 can involve, in response to the detected selection of the preview 318a, 318b of the multimedia content item from the multimedia content item display 316, overlaying a first control on the selected preview 318a, 318b of the multimedia content item. For example, in one or more embodiments, the first control overlaid on the selected multimedia content item may be an editing control 328. Additionally, in response to the detected selection of the preview 318a, 318b of the multimedia content item from the multimedia content item display 316, the act 606 may also include overlaying a second control on the selected preview 318a, 318b of the multimedia content item. For example, in one or more embodiments, the second control overlaid on the selected preview 318a, 318b of the multimedia content items may be a send control 330. Furthermore, in response to the detected selection of the preview 318a, 318b of the multimedia content item from the multimedia content item display 316, the act 606 may also include blurring the selected preview 318a, 318b of the multimedia content item.

The method 600 may further include detecting a selection of the editing control 328 overlaid on the selected preview 318a, 318b of the multimedia content item. For example, in one or more embodiments, the detected selection of the editing control 328 may be a tap touch gesture. Furthermore, in response to the detected selection of the editing control 328 overlaid on the selected preview 318a, 318b of the multimedia content item, the method 600 may also include presenting a copy 319 of the multimedia content item associated with the selected preview 318a, 318b for editing.

The method 600 may also include receiving one or more edits 334, 334b to the copy 319 of the multimedia content item. For example, receiving one or more edits 334, 334b to the copy 319 of the multimedia content item may be in response to presenting the copy 319 of the multimedia content item for editing. The method 600 may further include adding the copy 319 of the multimedia content item with the one or more edits 334, 334b to the communication thread 306. Additionally, the method 600 may include sending the copy 319 of the multimedia content item with the one or more edits 334, 334b. For example, the method 600 may include sending the copy of the multimedia content item with the one or more edits 334, 334b to the one or more co-users.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

One or more embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
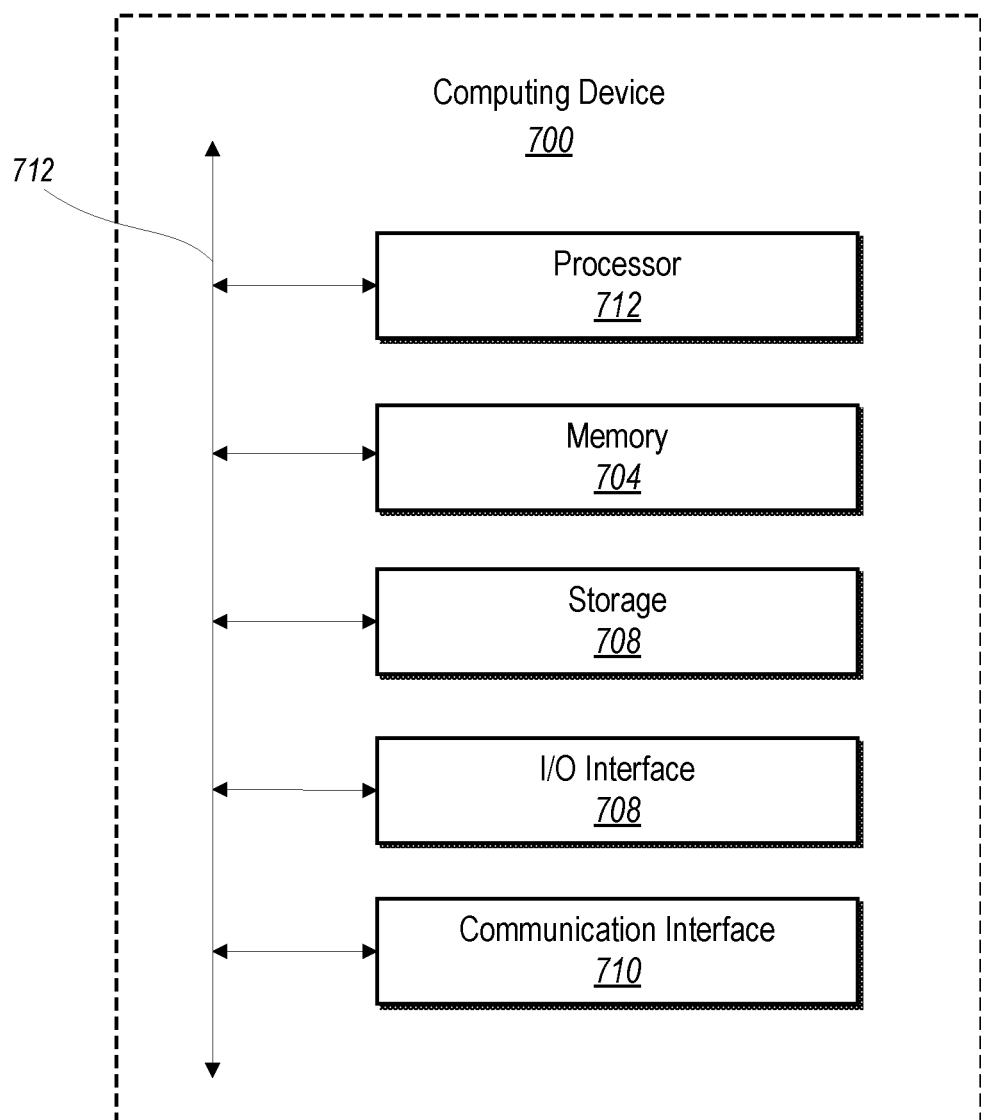
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the electronic messaging system 100. Any of the computing devices 202, 204, 300 or communication server 208 can comprise a computing device 700. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 608 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the network 206 and/or communication server 208 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 8:
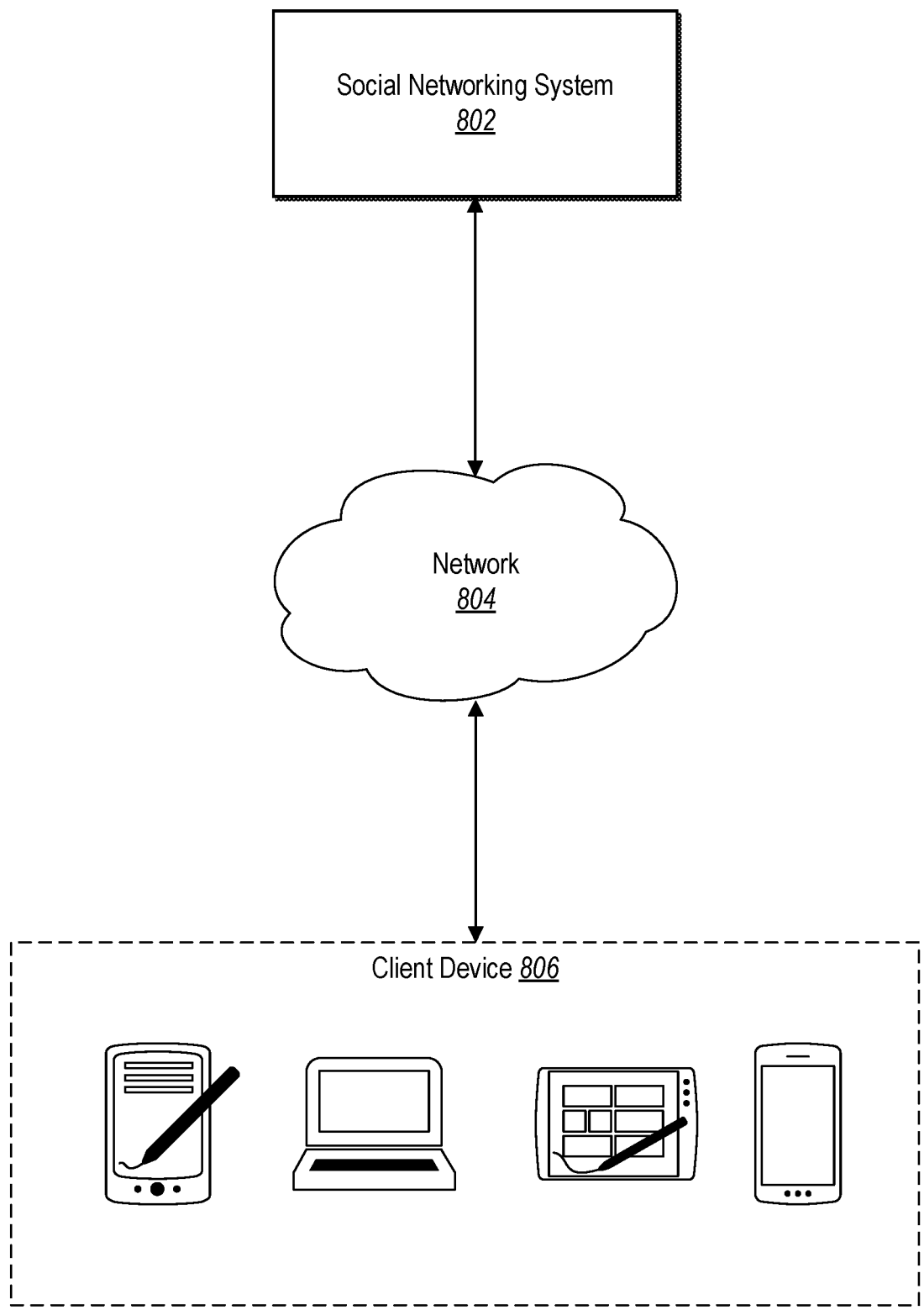
FIG. 8 is an example network environment of a social networking system in accordance with one or more embodiments.

FIG. 8 illustrates an example network environment of a social-networking system. In one or more embodiments, a social-networking system 802 may comprise one or more data stores. For example, the social-networking system 802 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In one or more embodiments, the social-networking system 802 may comprise one or more computing devices (e.g., servers) hosting functionality directed to operation of the social-networking system. A user of the social-networking system 802 may access the social-networking system 802 using a client device such as client device 806. In particular, the client device 806 can interact with the social-networking system 802 through a network 804.

The client device 806 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access the social-networking system 802.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer readable storage medium having stored thereon computer-executable instructions that, when executed by a processor, cause a mobile client device to:
provide a two-portion messaging graphical user interface of a messaging application, the two-portion messaging graphical user interface comprising a communication thread of a plurality of electronic messages in an upper first portion, and an input control palette in a lower second portion;
transition from the two-portion messaging graphical user interface to a three-portion messaging graphical user interface, the three-portion messaging graphical user interface comprising:
a reduced sized upper first portion including a most recent subset of the plurality of electronic messages in the communication thread in the two-portion messaging graphical user interface;
the input control palette; and
a third portion comprising a preview of one or more multimedia content items from a camera roll of the mobile client device that is available for sending as an electronic message, the preview of the one or more multimedia content items being within a scrollable multimedia content item display area that spans a bottom edge of the three-portion messaging graphical user interface;
receive a selection of a preview of a multimedia content item from the scrollable multimedia content item display area of the three-portion messaging graphical user interface;
without navigating away from the messaging application, provide the multimedia content item together with one or more editing controls;
edit the multimedia content item based on user interaction with the one or more editing controls;
send the edited multimedia content item as an electronic message; and
add the edited multimedia content item to the communication thread.

2. The non-transitory computer readable storage medium as recited in claim 1, wherein the one or more multimedia content items comprise one or more digital photographs or digital videos.

3. The non-transitory computer readable storage medium as recited in claim 1, further storing computer-executable instructions that, when executed by the processor, cause the mobile client device to crop the preview of each of the one or more multimedia content items.

4. The non-transitory computer readable storage medium as recited in claim 3, further storing computer-executable instructions that, when executed by the processor, cause the mobile client device to tailor the cropped preview of each of the one or more multimedia content items to an aspect ratio of the third portion that spans the bottom edge of the three-portion messaging graphical user interface.

5. The non-transitory computer readable storage medium as recited in claim 1, further storing computer-executable instructions that, when executed by the processor, cause the mobile client device to:
transition directly from the two-portion messaging graphical user interface to the three-portion messaging graphical user interface.

6. The non-transitory computer readable storage medium as recited in claim 1, wherein the preview of the one or more multimedia content items are horizontally scrollable within the multimedia content item display area that spans the bottom edge of the three-portion messaging graphical user interface.

7. The non-transitory computer readable storage medium as recited in claim 1, further storing computer-executable instructions that, when executed by the processor, cause the mobile client device to:
determine a portion of a digital video comprising a threshold percentage of the digital video; and
wherein providing the preview of the one or more multimedia content items comprises auto playing the portion of the digital video within the scrollable multimedia content item display area.

8. The non-transitory computer readable storage medium as recited in claim 1, further storing computer-executable instructions that, when executed by the processor, cause the mobile client device to:
receive the selection of the preview of the multimedia content item from the third portion by detecting a press-and-hold touch gesture selection of the preview of the multimedia content item from within the scrollable multimedia content item display area; and
provide the multimedia content item together with one or more editing controls by providing a copy of the multimedia content item in a user interface in place of the three-portion messaging graphical user interface.

9. The non-transitory computer readable storage medium as recited in claim 8, further storing computer-executable instructions that, when executed by the processor, cause the mobile client device to:
detect an over-scroll of the scrollable multimedia content item display area; and
in response to the detected over-scroll, replace the three-portion messaging graphical user interface with a display of the camera roll providing the camera roll in place of the three-portion messaging graphical user interface.

10. A mobile device comprising:
at least one processor; and
at least one non-transitory computer-readable storage medium storing instructions thereon that, when executed by the at least one processor, cause the mobile device to:
provide a two-portion messaging graphical user interface of a messaging application, the two-portion messaging graphical user interface comprising a communication thread of a plurality of electronic messages in an upper first portion, and an input control palette in a lower second portion;
transition from the two-portion messaging graphical user interface to a three-portion messaging graphical user interface, the three-portion messaging graphical user interface comprising:
a reduced sized upper first portion including a most recent subset of the plurality of electronic messages in the communication thread in the two-portion messaging graphical user interface;
the input control palette; and
a third portion comprising a preview of one or more multimedia content items from a camera roll of the mobile device that is available for sending as an electronic message, the preview of the one or more multimedia content items being within a scrollable multimedia content item display area that spans a bottom edge of the three-portion messaging graphical user interface;
receive a selection of a preview of a multimedia content item from the scrollable multimedia content item display area of the three-portion messaging graphical user interface;
without navigating away from the messaging application, provide the multimedia content item together with one or more editing controls;
edit the multimedia content item based on user interaction with the one or more editing controls;
send the edited multimedia content item as an electronic message; and
add the edited multimedia content item to the communication thread.

11. The mobile device as recited in claim 10, further storing instructions thereon that, when executed by the at least one processor, cause the mobile device to;
in response to a detected press-and-hold touch gesture selection of the preview of the multimedia content item from the scrollable multimedia content item display area, overlay a first control on the selected preview of the multimedia content item; wherein the first control overlaid on the selected preview of the multimedia content item is a first editing control; and
provide the multimedia content item together with one or more editing controls in response to selection of the first editing control.

12. The mobile device as recited in claim 11, further storing instructions thereon that, when executed by the at least one processor, cause the mobile device to, in response to the detected press-and-hold touch gesture selection of the preview of the multimedia content item from the scrollable multimedia content item display area, overlay a second control adjacent to the first control on the selected preview of the multimedia content item.

13. The mobile device as recited in claim 12, wherein the second control overlaid on the selected preview of the multimedia content item is a send control.

14. The mobile device as recited in claim 13, further storing instructions that, when executed by the at least one processor, cause the mobile device to, in response to the detected press-and-hold touch gesture selection of the preview of the multimedia content item from the scrollable multimedia content item display area, blur the selected preview of the multimedia content item underlying the first control and the second control.

15. The mobile device as recited in claim 14, further storing instructions that, when executed by the at least one processor, cause the mobile device to:
provide the multimedia content item together with one or more editing controls by providing a copy of the multimedia content item in a user interface in place of the three-portion messaging graphical user interface; and
edit the multimedia content item based on user interaction with the one or more editing controls by editing the copy of the multimedia content item.

16. The mobile device as recited in claim 15, wherein the multimedia content item within the camera roll is not edited in response to editing the copy of the multimedia content item.

17. The mobile device as recited in claim 16, wherein the one or more multimedia content items comprise one or more digital photographs or digital videos.

18. The mobile device as recited in claim 15, further storing instructions that, when executed by the at least one processor, cause the mobile device to provide the multimedia content item together with one or more editing controls by providing a crop editing control, an auto-edit control, and a color edit control.

19. The mobile device as recited in claim 10, further storing instructions thereon that, when executed by the at least one processor, cause the mobile device to:
   crop the preview of each of the one or more multimedia content items to a size that allows multiple previews to fit within the scrollable multimedia content item display area; and
   provide a plurality of cropped previews simultaneously together within the scrollable multimedia content item display area.

20. A method comprising:
   providing a two-portion messaging graphical user interface of a messaging application, the two-portion messaging graphical user interface comprising a communication thread of a plurality of electronic messages in an upper first portion, and an input control palette in a lower second portion;
   transitioning from the two-portion messaging graphical user interface to a three-portion messaging graphical user interface, the three-portion messaging graphical user interface comprising:
      a reduced sized upper first portion including a most recent subset of the plurality of electronic messages in the communication thread in the two-portion messaging graphical user interface;
      the input control palette; and
      a third portion comprising a preview of one or more multimedia content items from a camera roll of a mobile device that is available for sending as an electronic message, the preview of the one or more multimedia content items being within a scrollable multimedia content item display area that spans a bottom edge of the three-portion messaging graphical user interface;
   receiving a selection of a preview of a multimedia content item from the scrollable multimedia content item display area of the three-portion messaging graphical user interface;
   without navigating away from the messaging application, providing the multimedia content item together with one or more editing controls;
   editing the multimedia content item based on user interaction with the one or more editing controls;
   sending the edited multimedia content item as an electronic message; and
   adding the edited multimedia content item to the communication thread.

* * * * *